INVENTOR
ROBERT E. STOFFELS
MARTIN R. WINANDY

ONE-OF-FIVE ENCODER 400

Feb. 3, 1970  R. E. STOFFELS ET AL  3,493,930
SUPERVISORY CONTROL SYSTEM HAVING FOUR STATUS REPORTERS
Filed March 23, 1966  20 Sheets-Sheet 6

CONTROL LOGIC
600

DECIMAL DECODER
1100

CONTROL LOGIC
1300

STATION CHECK SCANNER 1500

Feb. 3, 1970  R. E. STOFFELS ETAL  3,493,930
SUPERVISORY CONTROL SYSTEM HAVING FOUR STATUS REPORTERS
Filed March 23, 1966  20 Sheets-Sheet 19
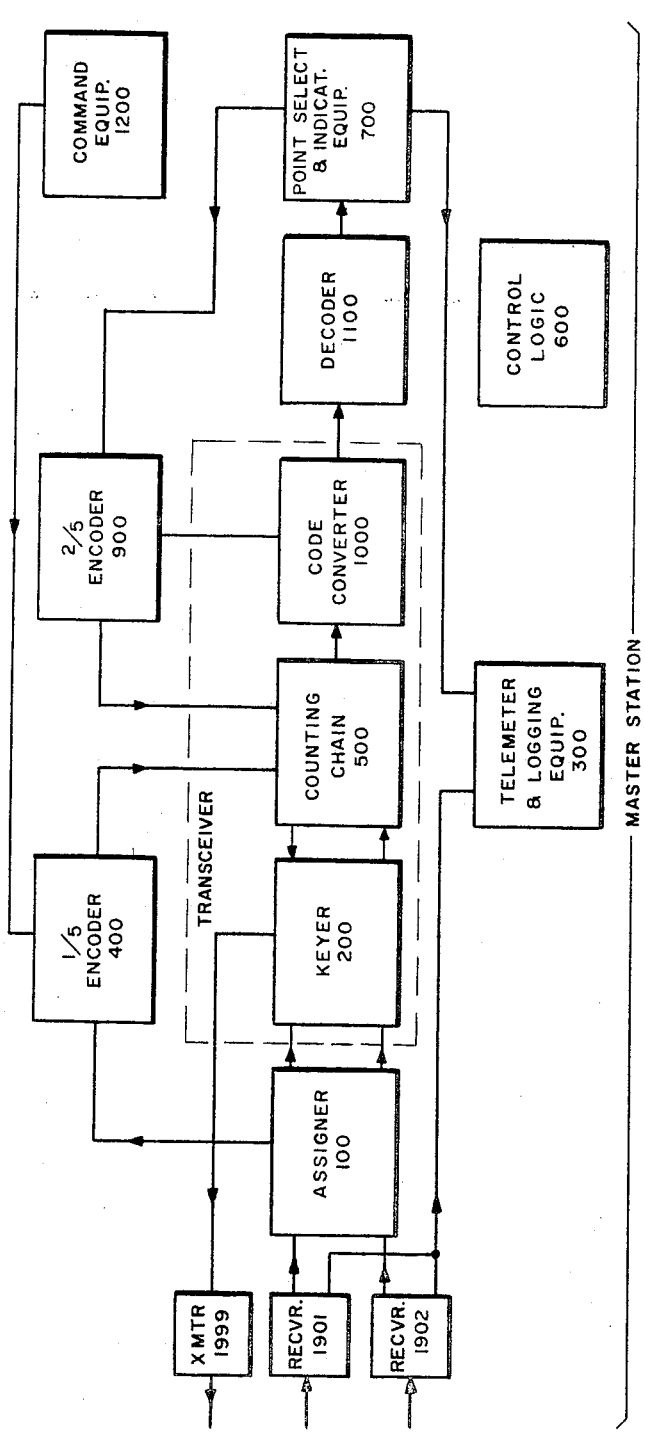
FIG. 19
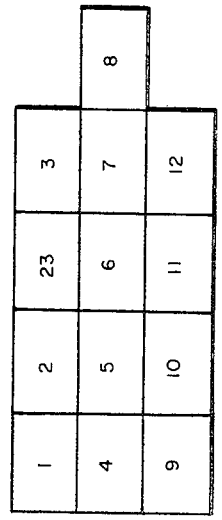
FIG. 22
FIG. 21
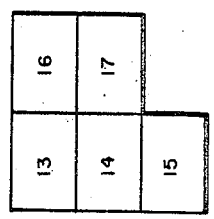
FIG. 20

CONTROL LOGIC
600

United States Patent Office 3,493,930
Patented Feb. 3, 1970

3,493,930
SUPERVISORY CONTROL SYSTEM HAVING FOUR STATUS REPORTERS
Robert E. Stoffels, Glen Ellyn, and Martin R. Winandy, Chicago, Ill., assignors, by mesne assignments, to Leeds & Northrup Company, Philadelphia, Pa., a corporation of Pennsylvania
Filed Mar. 23, 1966, Ser. No. 536,733
Int. Cl. H04q 5/00
U.S. Cl. 340—163          15 Claims

ABSTRACT OF THE DISCLOSURE

A quiescent control system for selectively operating remotely located equipment and automatically reporting changes in the status of such equipment. Audible and visual alarms notifying an operator of the location and nature of change, with inhibition of such alarms when the change was initiated by the operator.

---

This invention relates to a control system for use in fields such as electric power control, gas or petroleum pipeline control and its similar environments. More particularly, it pertains to a system providing means for selecting and operating control equipment at a distant point and reporting back to the initiating point an indication of the status of such control equipment. In addition it further includes facilities for the automatic reporting of changes in the status of such control equipment at the distant point to a common control point. In the present system, devices having two states such as (on-off) are supervised or controlled.

The instant system is basically a quiescent system, that is, it remains at rest until a change takes place in the supervised equipment. At that time the signals are telemetered to the master station where audible and visual alarms notify the operator of the location and nature of the change. By operation of controls at the master station, the operator can take appropriate action as required.

In addition, the present system provides facilities for presenting from a remote station, to a master station, on command, telemetered signals indicative of quantitative measurements taken at the remote station.

The control system which is the subject matter of the present invention may be considered as an improvement on the control system shown in the copending application Ser. No. 460,655 of L. B. Mitchell and R. E. Stoffels filed on June 2, 1965, and particularly as an improvement on the portions of the system shown in FIGURES 6, 7, 13, 14 and 15 of said copending application.

Accordingly it is the object of this invention to provide a system for controlling equipment at a remote station or a master station and telemetering information between said stations in electric power distribution, pipeline or similar systems.

The principal feature of the present invention is the inclusion of means whereby audible alarms are prevented from sounding, and visual alarms from flashing, if the remote station status reply agrees with the master station memory.

A secondary feature of the present invention is the inclusion of means for sequentially inducing an alarm condition at all distant points, to verify the integrity of the circuitry.

Another feature is the inclusion of "check-before-operate" mode of operation as a safeguard to improper operation.

Another feature is the adaptation of similar circuitry for use at both master and remote stations.

A final feature is the inclusion of circuitry that may be readily expanded to provide for enlargement of the system based on the addition of additional control points at the remote station.

The above-mentioned and other objects and features of the invention and the manner of obtaining them will become more apparent and the invention itself will be best understood by reference to the following description of the invention taken in conjuction with the accompanying drawings comprising FIGS. 1–23, wherein:

FIGS. 1–12 and 23 comprise a diagram showing the equipment located in a master station for use in the above-mentioned system;

FIGS. 13–17 inclusive comprise a diagram of a portion of the equipment located in a remote station for use in the instant system;

FIG. 19 shows a block diagram of a master station for use in the above-mentioned system;

FIG. 20 shows how

FIG. 21 shows how FIGS. 18 and 19 are to be arranged;

FIG. 22 shows how

Figure 1:
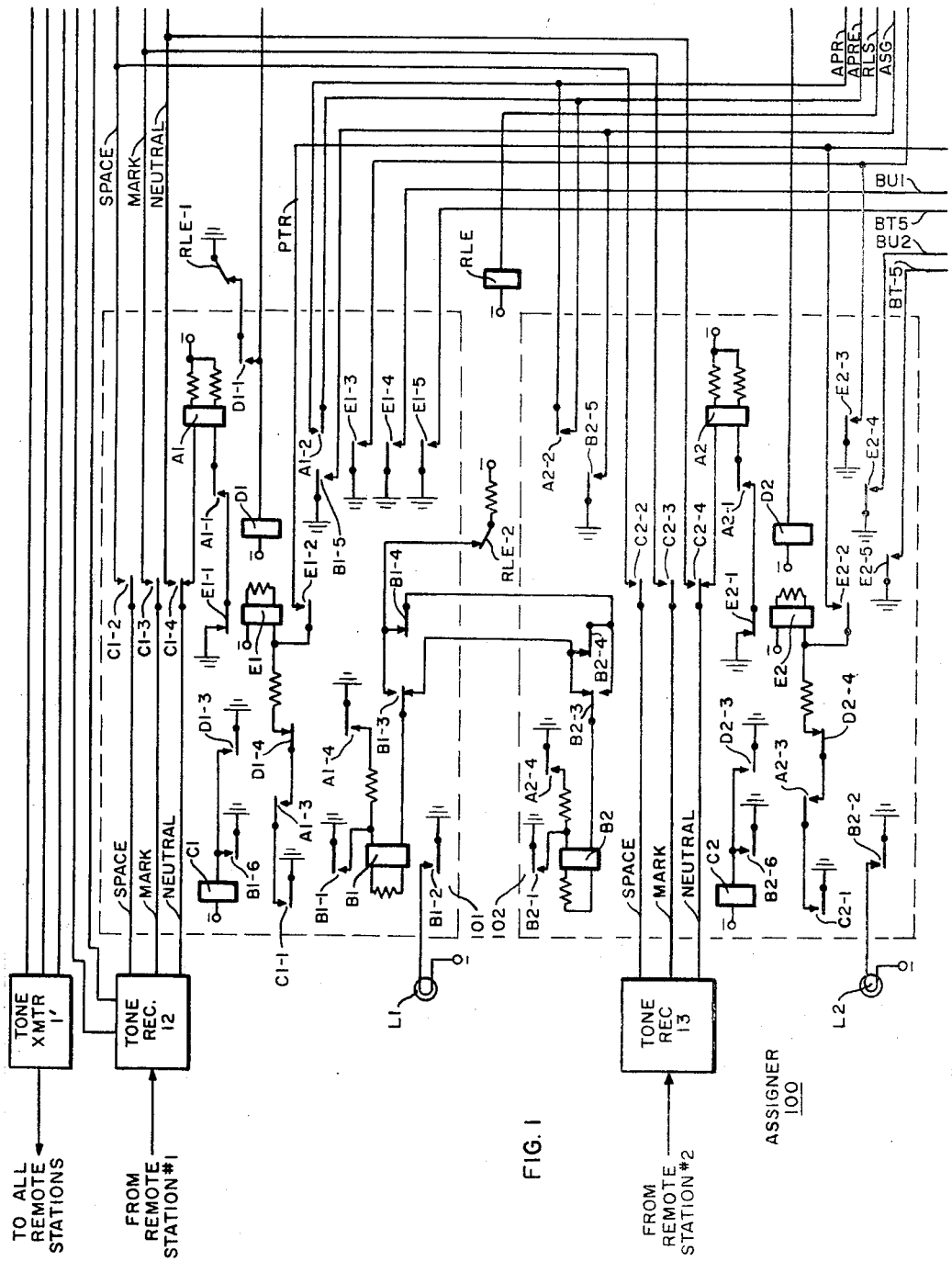
FIGS. 1–12 and 23 are to be arranged.

The instant supervisory control system is designed to control remotely located devices that may be either directly or indirectly electrically actuated. Devices whose status may be determined by the opening or closing of contacts may be supervised at a central location. Likewise data whose parameters are available in electrical analog form my be telemetered on request to a central location.

The system as described and disclosed is initially equipped for less than 100 points, however with obvious modification this could easily be expanded to the control and telemetry of up to 1000 devices.

The present system is of the quiescent type. That is to say at both the master and remote stations the operation is on a standby basis until such time as action, either by the master or remote stations, is initiated. This approach provides long operating life because of the lack of constant exercise of components, as is usually found in a system employing a continuous scan.

Because of the large number of devices or points that the system can serve it is natural to expect that these devices may be located in many different places. The system, as a result, is designed to handle multiple and remote stations in any reasonable quantity. Several security measures to prevent invalid and perhaps dangerous system operations from occurring are included in the system. The system employs message security, code security, operation security and addressing security.

The method used to generate messages from the master to remote and from remote to the master station has been designed to be similar in philosophy. As a result the encoding, decoding and transceiver circuits are identical in operation at both the master and remote stations. These similarities even extend as far as the end element circuits. These circuits do differ since the master station end element circuit such as lamps, pushbuttons, etc. are manually activated, whereas the remote end element circuits, contact supervision, interpose relays, etc. are automatically activated. However the design philosophy is essentially the same.

The present system as described employs frequency shift keying, however, it can readily be adapted to the use of D.C. signalling. Messages transmitted between master and remote stations are subjected to several checks before they either are accepted or rejected by the system. These checks are discussed below.

When a system as disclosed serves 100 points or less, it employs a two digit coded message. A system serving more than 100 points would employ three digit coded message. All two digit messages are composed of 10 binary digits (bits) and all three digit messages would be 15 bits long. One message length is used in a given system depending on the system size. Therefore if any transmission between master and remote stations is distorted in such a way that it is too long or too short it would be rejected.

The code used is the two-out-of-five (2/5) and the one-out-of-five (1/5) 74210 binary code decimal (BCD) format.

In the 2/5 mode, five bits are used to code individual decimal numbers. Two of these bits are always a binary "1" and the remaining three bits are always a binary "0." Ten combinations can be coded using this technique. A two digit decimal message will therefore always contain ten binary digits.

The 1/5 code is used in the same manner. That is to say each code combination always contains one binary "1" and four binary "0" bits. The parity check on any incoming message which contains a distortion error can be readily detected, by checking to see that each code received has the right number of binary ones and zeros.

The operational system also permits another security check to be made. Three message transmissions take place between the master and remote station before a given operation is completed. The first message (2/5) from the sending station identifies the particular point at the receiving station. The second transmission (2/5) returns the point identification code to the sending station. At the sending station the two point identification codes are compared. If no error has occurred during the two transmissions, the codes would agree. When code agreement occurs, the third code transmission (1/5) is allowed to begin. For a remote to master station transmission the third transmission contains the coded status of the selected point. For a master to remote third transmission the message will be the command for the selected point. This check before operate technique permits a complete test of the system to be used.

The 1/5 code used for status reports or system commands are assigned in such a way that a double error must occur in both words before one valid code can be interpreted as another valid code. This additional security is provided to account for the fact that the 1/5 code which is used in the third transmission is not provided with any check-before-operate security as are the first two transmissions.

Figure 17:
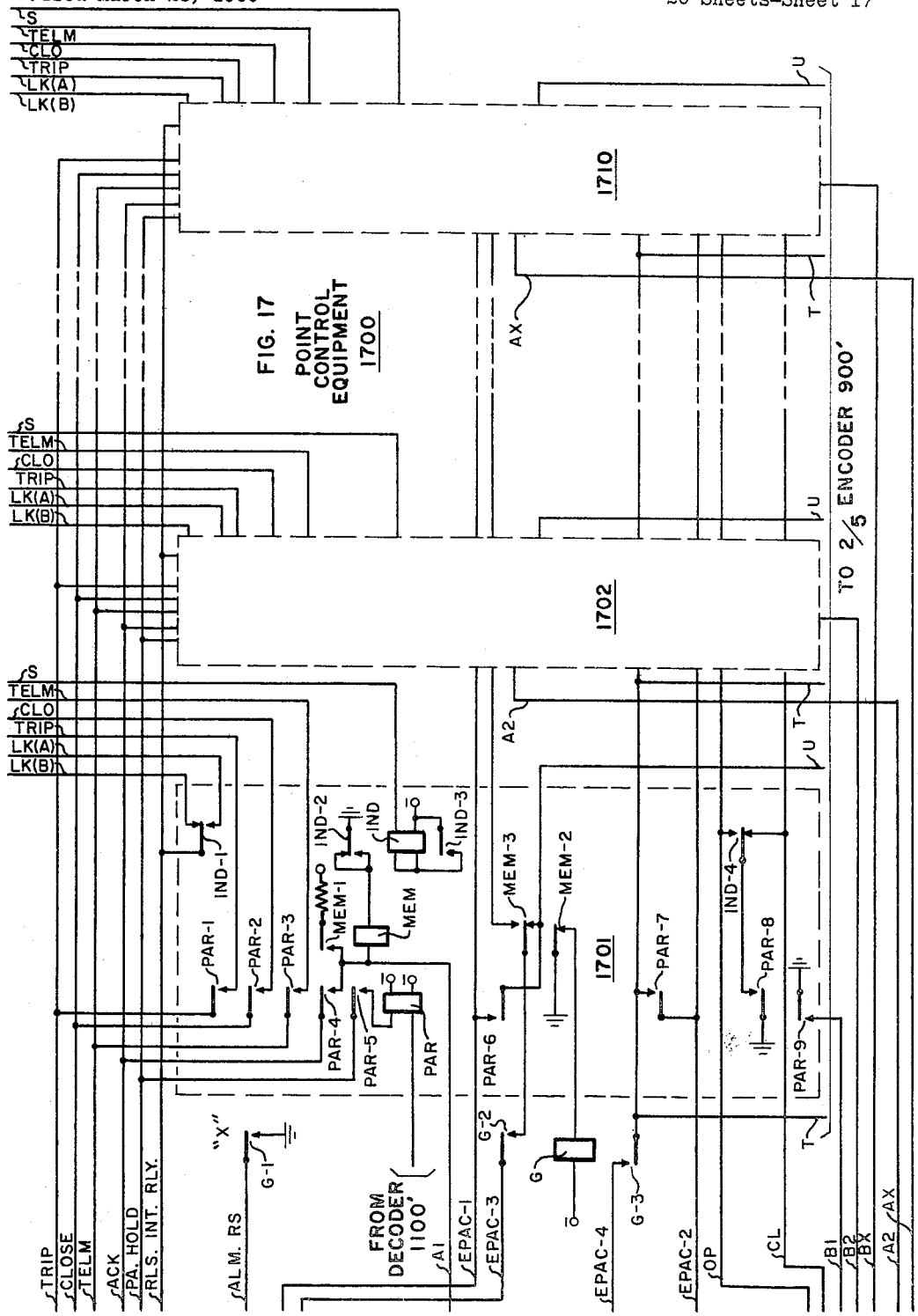
Figure 18:
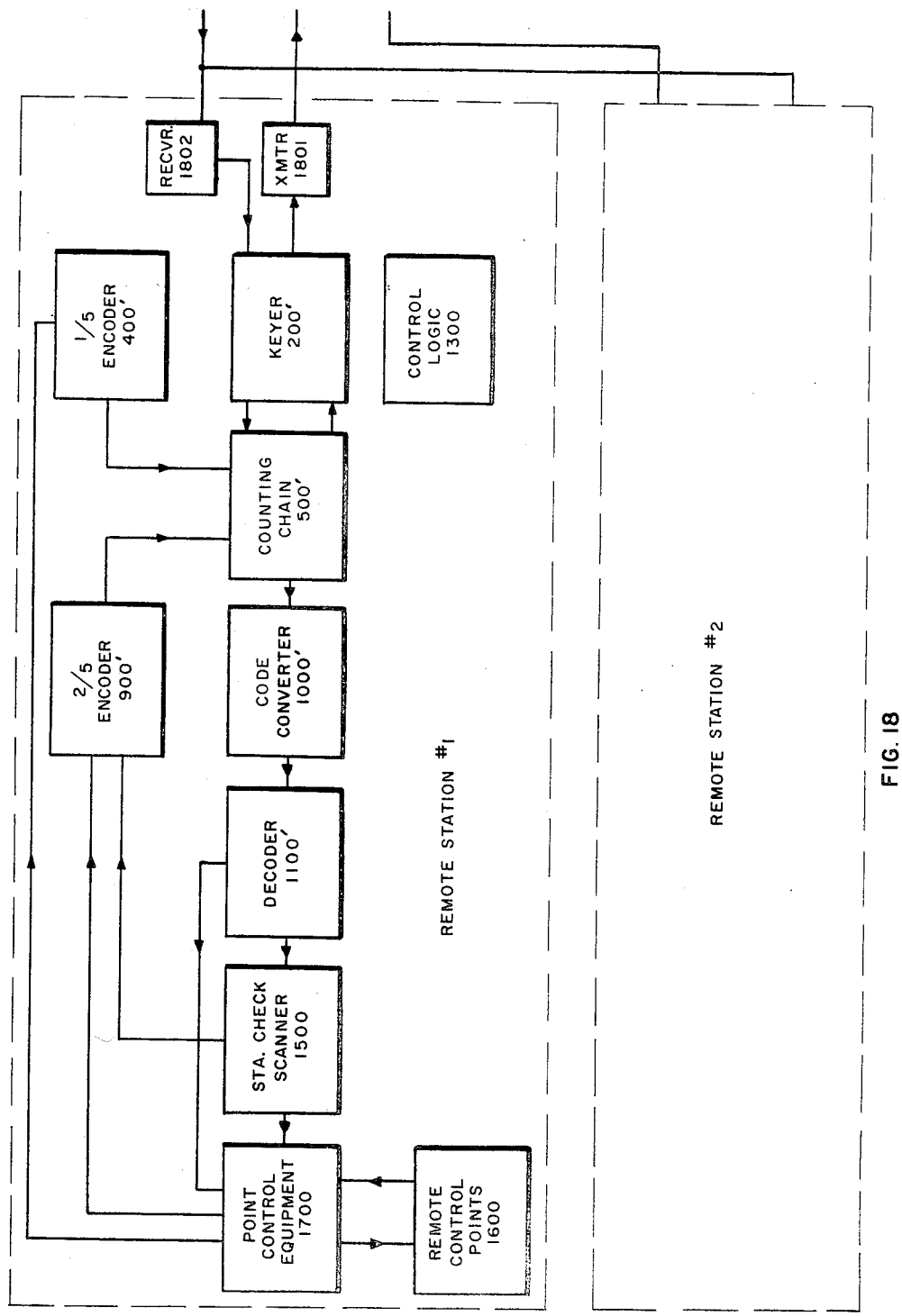
FIG. 18 shows a block diagram of a remote station for use in the above-mentioned system.

The characteristics and features of the instant system can be better understood by describing the typical operation of the system in conjunction with the drawings consisting of FIGS. 1-17 inclusive and the block diagrams of FIGS. 18 and 19.

Figure 7:
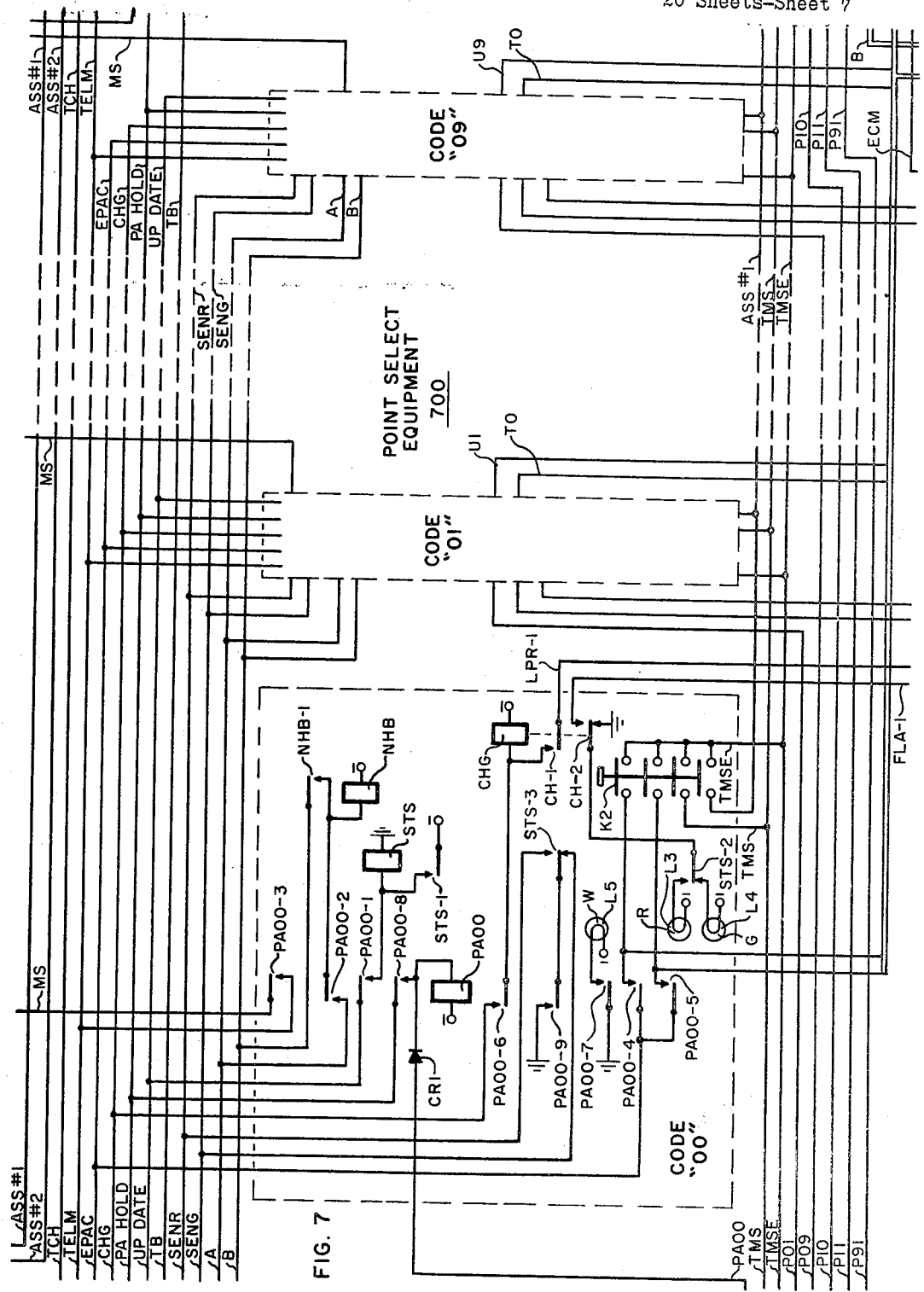
Figure 8:
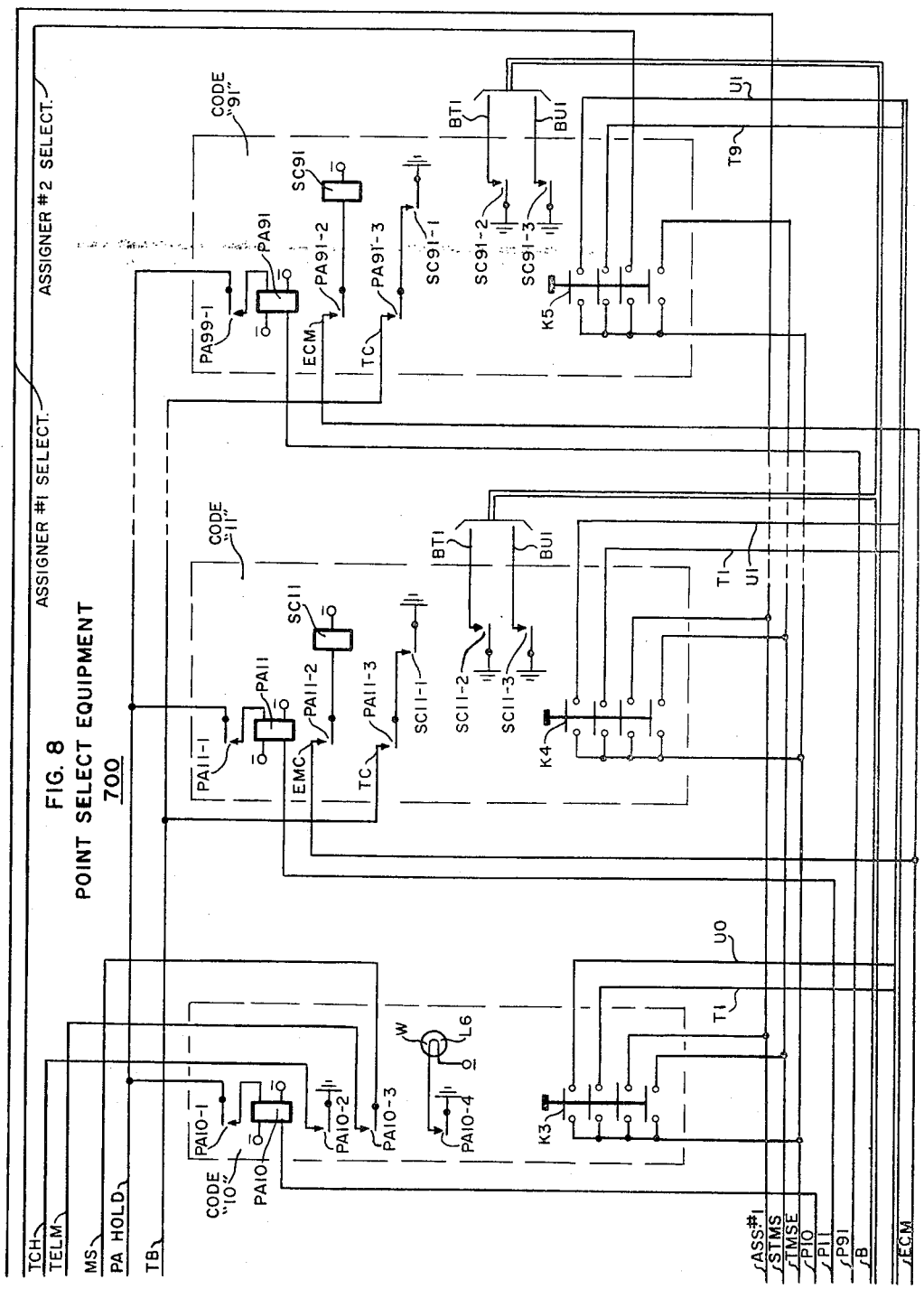

Point selection equipment 700 comprising the master station controls and indicating lamps as shown in FIGS. 7 and 8 are located on small escutcheon panels. For a typical on-off control point this escutcheon will be equipped with a name plate for identification of the point, a red lamp such as L3, a green lamp such as L4 and a white lamp such as L5. The red and green lamps indicate the status of the control device and the white lamp is lighted when the check before operate test is satisfied. In addition to this, a pushbutton such as K2 is used to initiate the point selection sequence.

Figure 12:
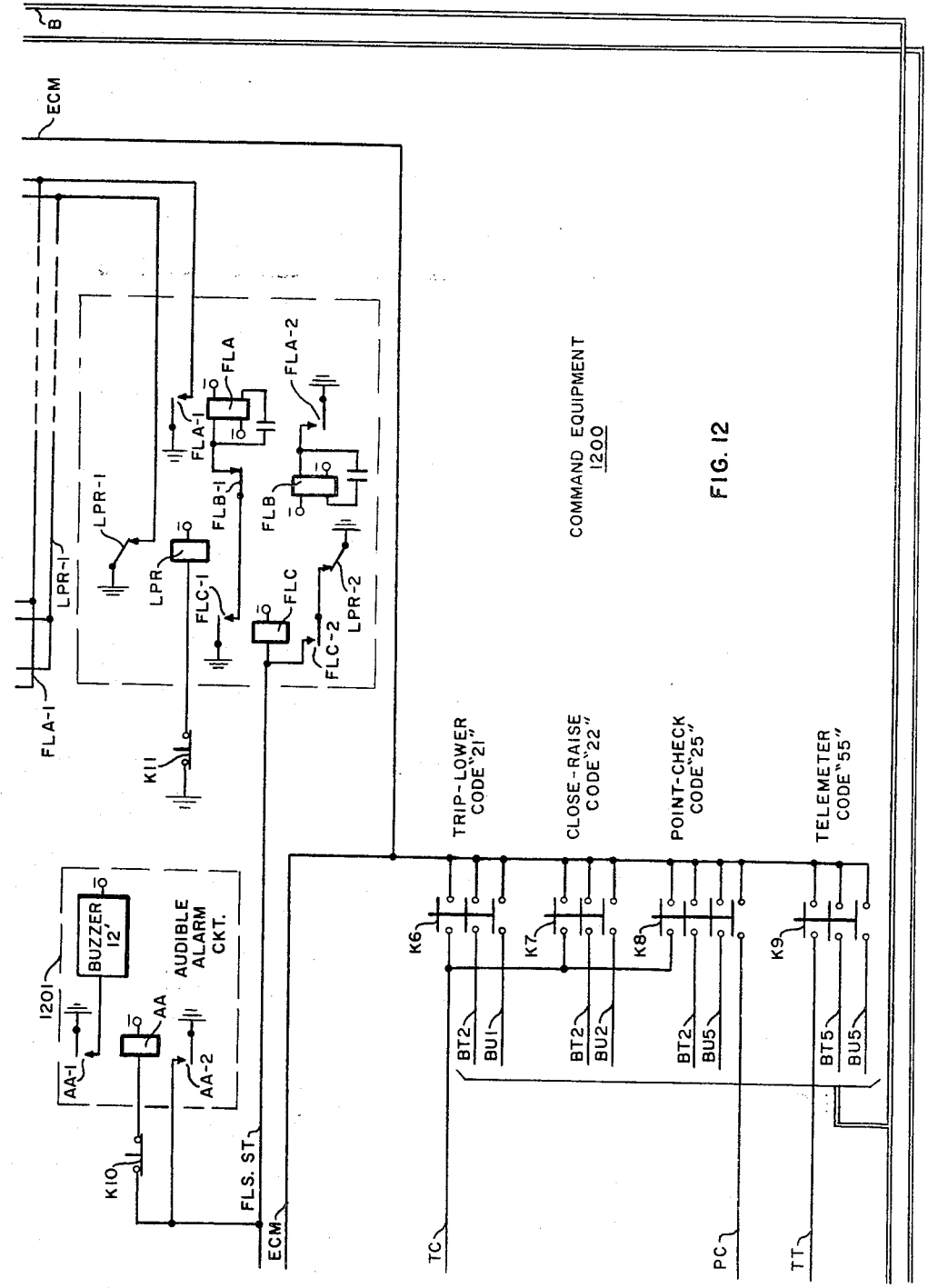

The command equipment 1200 includes pushbuttons or keys which are used for command and system checks such as K6, K7, K8 and K9 as shown in FIG. 12 are considered to be common and are centrally located on the control panel.

The point selection of any system point works as follows: A point selection pushbutton such as K2 is depressed. The 2/5 code assigned to this point is transmitted from the master to the remote station. The remote station receives this message and first verifies that it is of the correct length. The 2/5 parity check is made during the decoding routing. If the security checks are satisfied up to this point, the end device circuit operation will be prepared. Preparation of the circuit causes the same 2/5 point code to be retransmitted to the master station.

The master station has stored the point address transmitted in the encoder 900 and waits for the same address to be returned by the remote station. When the return code is received at the master station it too is subjected to the message length and parity check tests. When the tests are passed the received address is compared with the transmitted address. If they are the same, the white lamp such as L5 on the point escutcheon will be lighted. This signifies to the system dispatcher or operator that circuits have been properly prepared at both the master and the remote stations and that the appropriate command can now be sent.

When the desired command pushbutton such as K6 is depressed, the 1/5 code assigned to that command (in this case "21") is transmitted to the remote. After transmission is completed, the master station circuits are reset.

The 1/5 code, when received at the remote station, is checked for message length and parity as were the 2/5 codes. If no errors have occurred, the command code will be decoded by decoder 110 and will operate the device associated with the previously prepared point circuit. The remote station circuits will then reset.

When a remote station device changes state, a reporting sequence will be automatically initiated. The device status contact included in the point control equipment 1700 will change state and cause a 2/5 coded point address to be transmitted to the master station. At the master the message will be received and checked for errors. If no errors have occurred the point address circuit for the "changed" point will be operated. The operation of the circuit will cause the same 2/5 coded point address to be retransmitted to the remote station. When the message is received at the remote, error check will again be made. If the message is error free it will be compared with the address which was first transmitted. If the two addresses agree the 1/5 code representing the new status will be transmitted to the master station.

The new status when checked will be decoded at the master station by decoder 1100 and will be displayed on the point escutcheon. The method in which the new status is displayed will be defined in the discussion covering the types of points available in the system.

The system will not permit any alarm from the remote station to be lost, based upon a technique that a particular system condition must exist after each message transmission. If these conditions do not exist a new reporting sequence will be started.

The capability to routine the system points to verify their status is also included in the system shown here. This feature is brought into service by depressing the pushbutton associated with this feature for any given remote station. In the present system the key K4 serves this function for remote station 1 and the keys K5 for remote station 2 as shown in FIG. 8.

Figure 23:
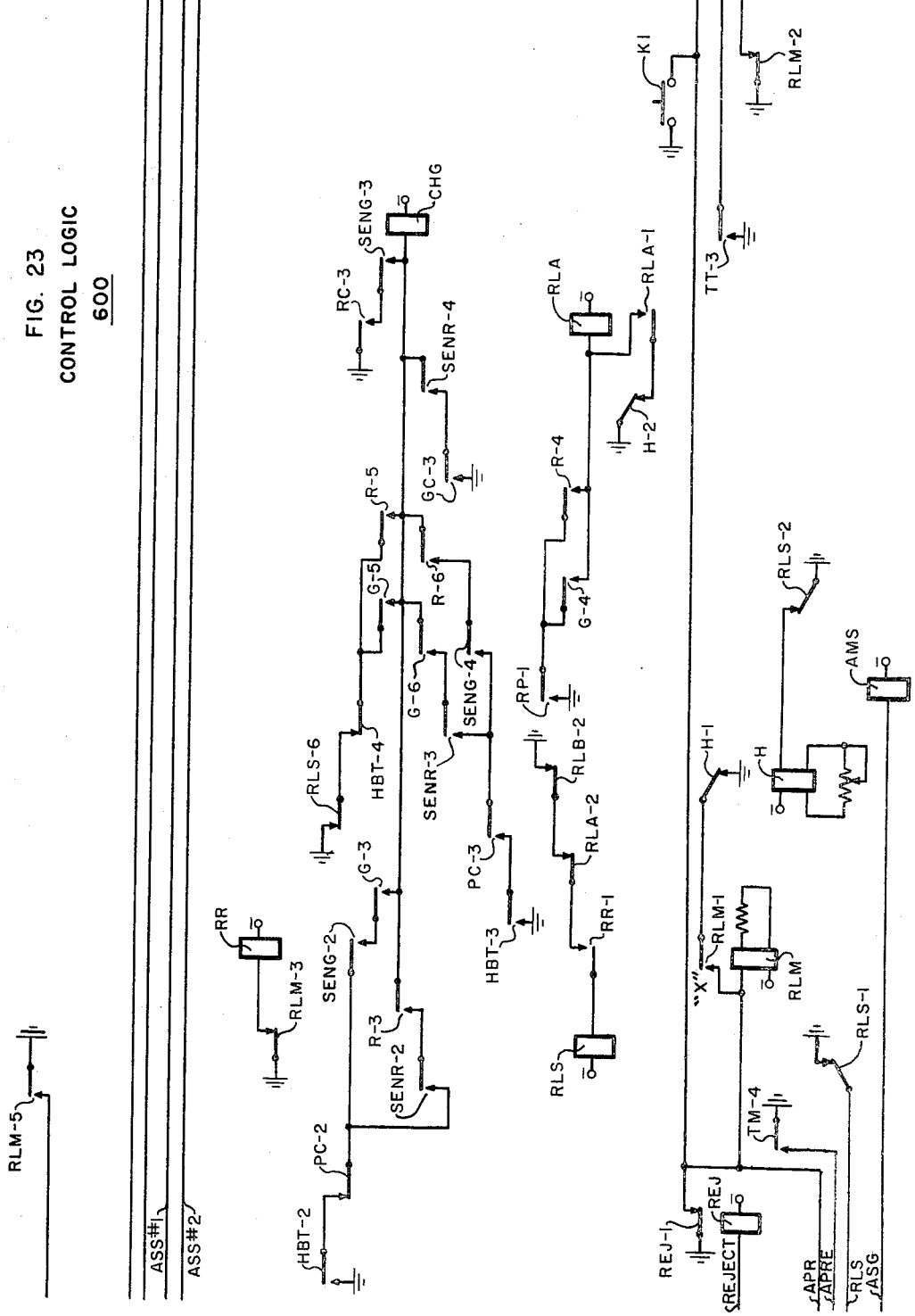

In the remote station the station check circuit 1500 will sequentially simulate a change of status to each supervisory point in the system. The station check routine will stop should a true alarm occur. After the alarm has been acknowledged the station check will restart. If the dispatcher desired to interrupt or stop the routine, he may operate the system reset key K1 shown in FIGURE 23, then proceeding with the initiation of any other sequence desired. If the dispatcher is concerned about the validity of the status being displayed by a particular point, he may operate a point check test on an individual basis. To do this a pushbutton is depressed on the point escutcheon in question such as K2 and then when the white lamp indicating select or check before operate is lighted the point check pushbutton such as K8 shown in FIG. 12 is depressed. The point circuit at the remote station is then artificially induced to begin a change of status report with the true status of the device being reported to the master station.

Different from the aforereferenced copending application, the present system will inhibit audible alarms from sounding and point displays from flashing, if the remote station status reply agrees with the master station memory. This feature is known as alarm inhibit. The alarm of course will sound and lamp flash if the reply disagrees with the master station memory.

Likewise in the instant system, the rotary switch at the remote station will sequentially induce an alarm to provide a station check feature, by knocking down the memory really associated with the point. Logic circuitry is provided to tell the supervisory system that the alarm was induced by the station check circuit and to inhibit the audible alarm and flasher at the master station unless the point status disagrees with the status previously stored in the memory. The system will of course, recognize an actual alarm and report this with enabling the alarm inhibit feature. The station check operation will be held during the reporting of an actual alarm and after that will automatically continue the completion of the sequence. Furthermore, if the point change was authorized by the dispatcher at the master station, the alarm that would exist upon the change at the remote station will not be reported, but rather would be inhibited if the command sequence is completed successfully. If, however, it is not completed successfully and the command and the remote station do not agree such as the retripping of the circuit breaker after it was totally closed, an alarm will be given.

In the instant system the master station can control one, two or more remote stations. For purposes of this disclosure two remote stations have been shown. All of the remote station receivers are connected on a party line basis to a single communication channel.

Figure 2:
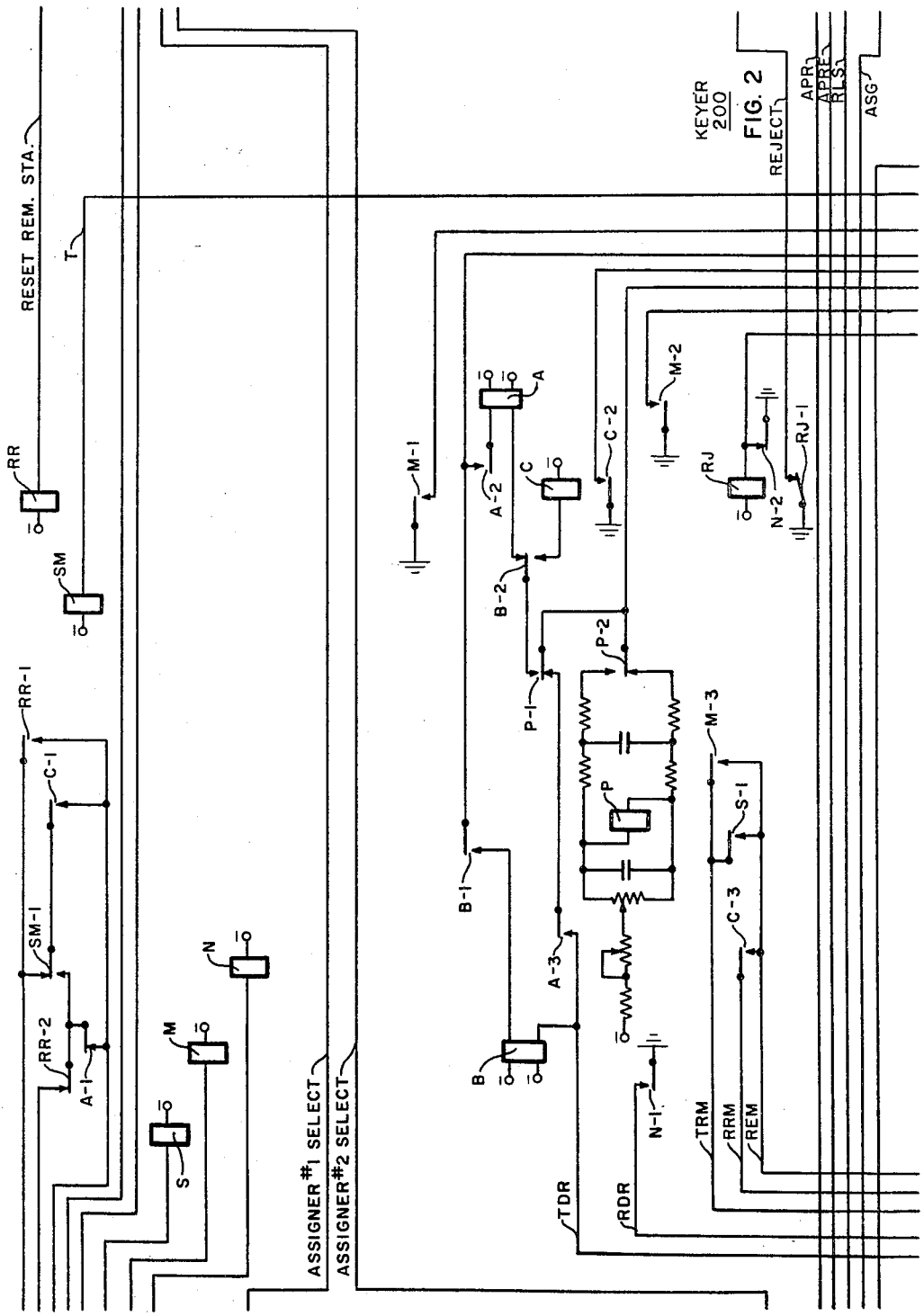
Figure 3:
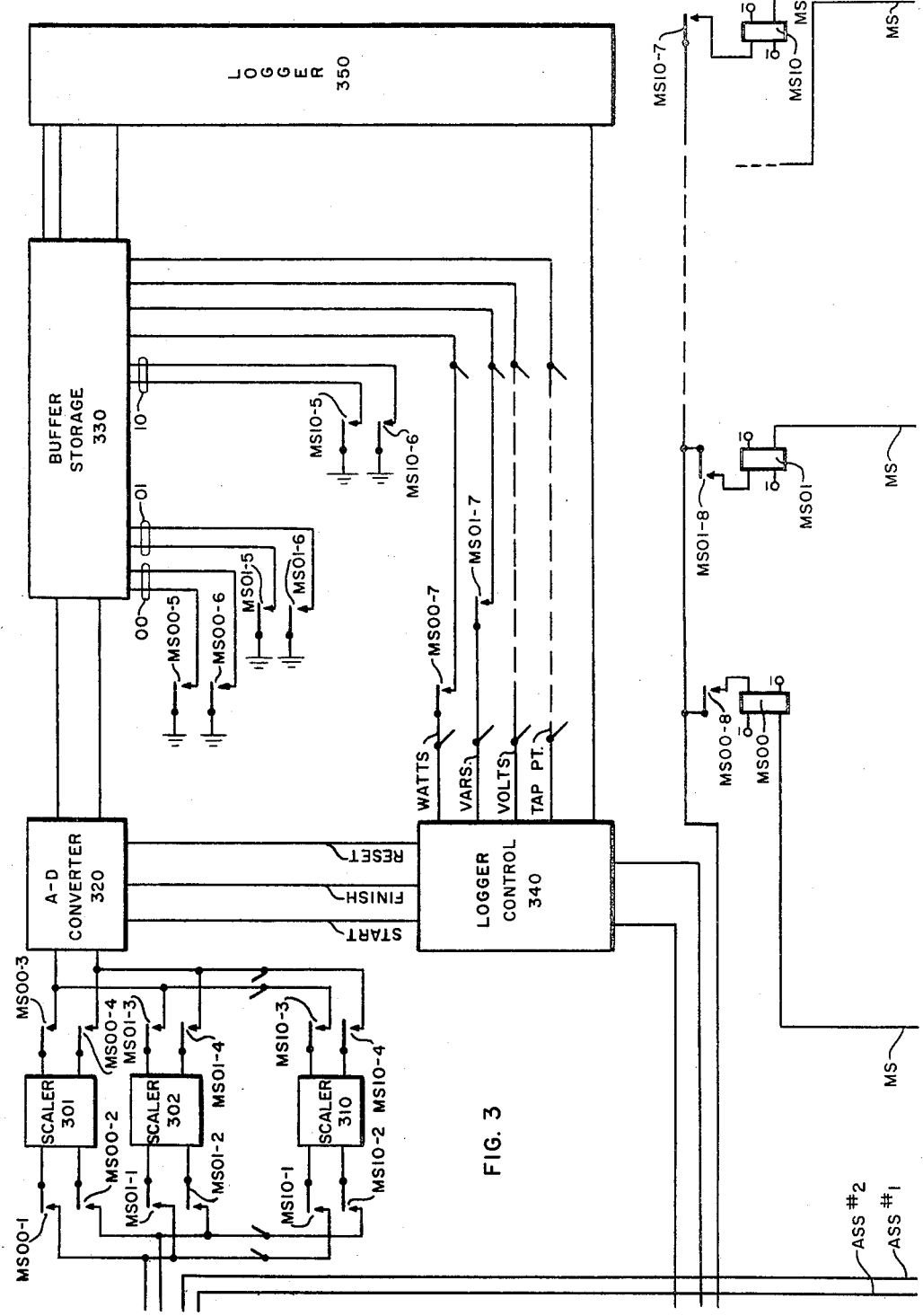
Figure 4:
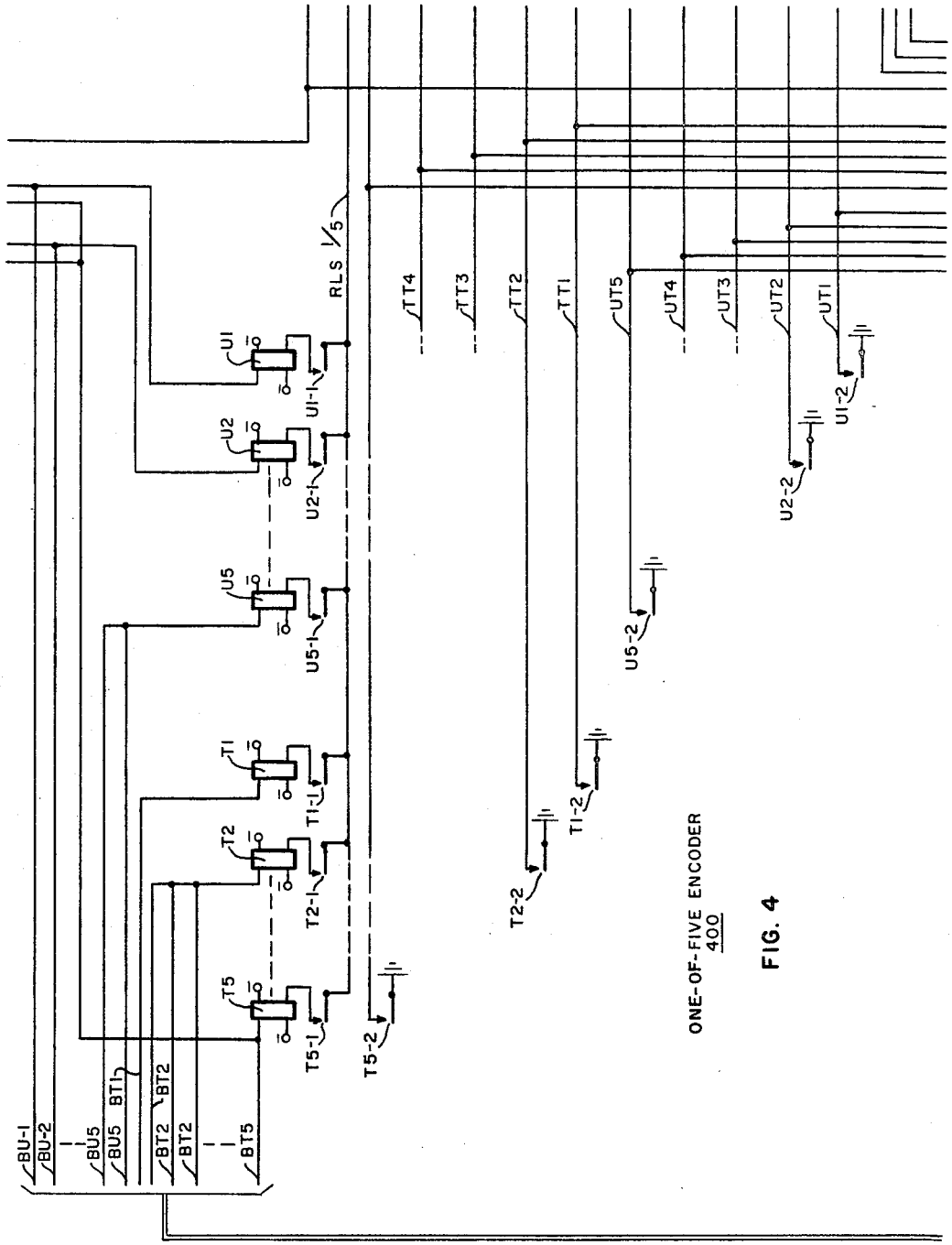
Figure 5:
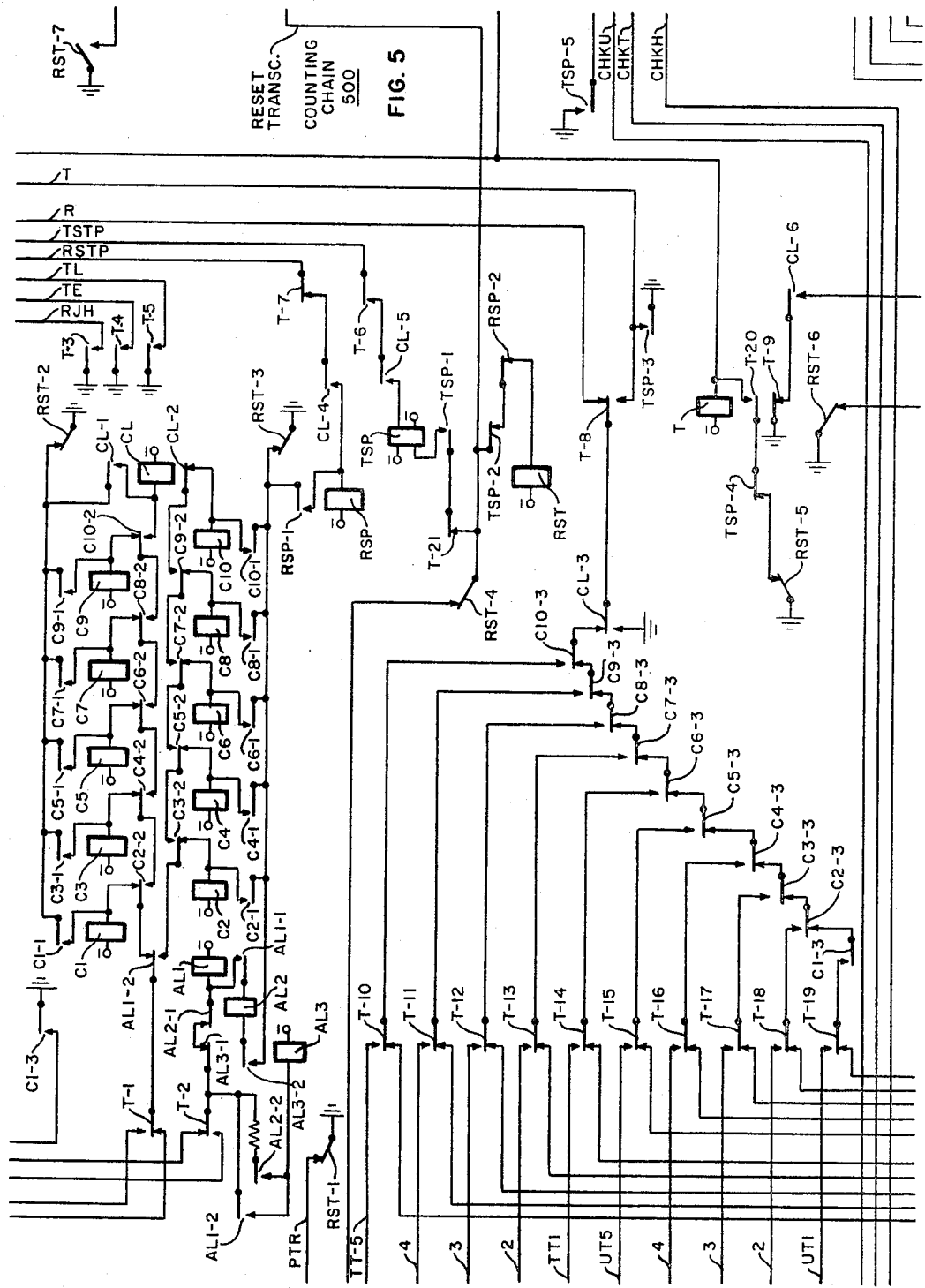
Figure 10:
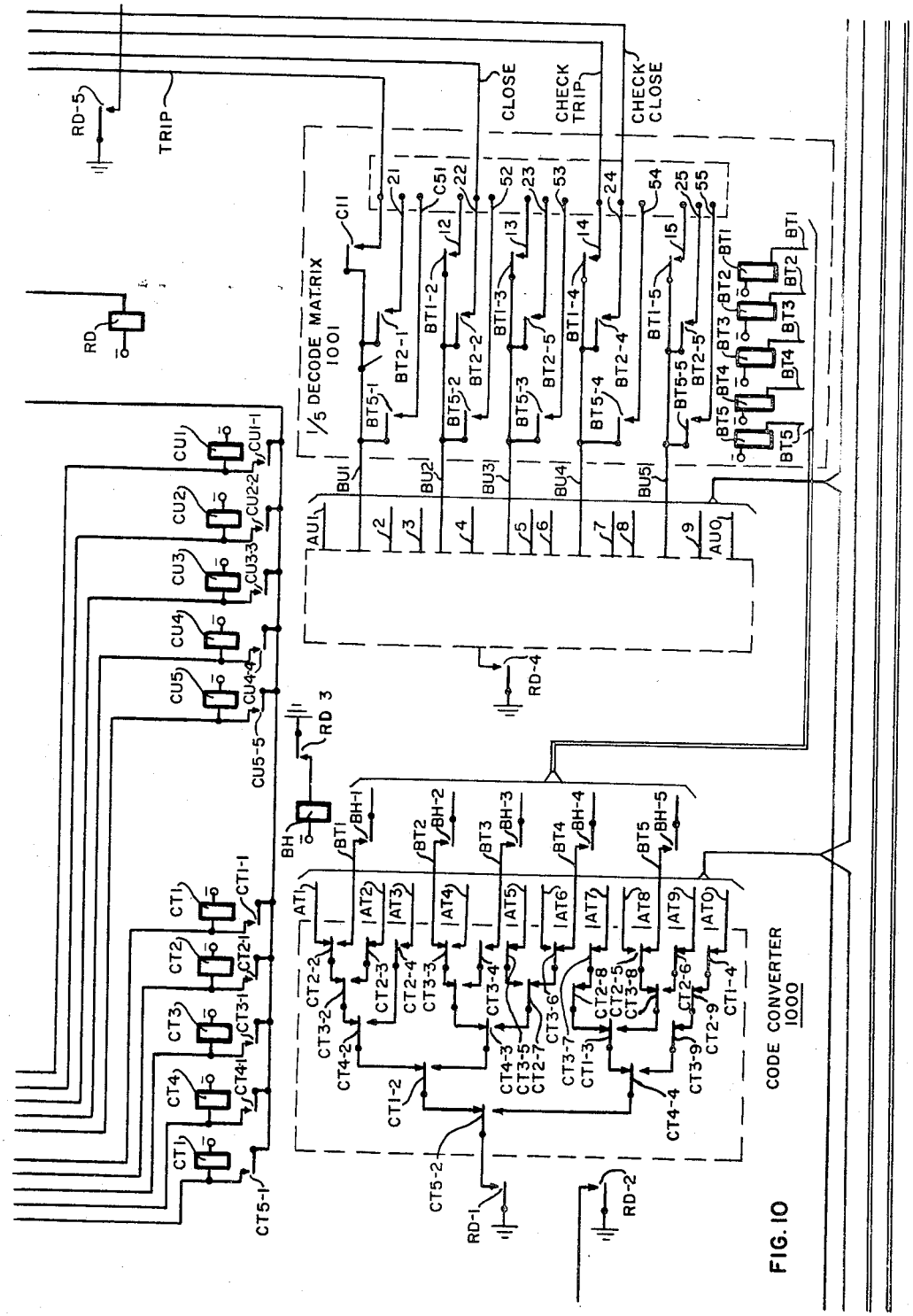

Referring now to FIG. 1 it will be noted that the tone transmitter 11 is shown as connected to all remote stations. The master station transmits to all remote stations simultaneously via a common communication facility. Each remote station transmits to the master station via an individual communication channel. As will be noted by referring to FIG. 1, a tone receiver 12 is connected to station 1 and tone receiver 13 to station 2. The master station transceiver shown in FIGS. 2, 5 and 10 is connected to only one of the remote stations at a time. The assigner circuit shown in FIG. 1 provides the necessary gating function by which the common transceiver equipment is connected to one and only one incoming communication channel. In other words the assigner circuit shown in FIG. 1 gates inward traffic from the remote stations into the master station common supervisory equipment. The circuit as disclosed in FIG. 1 provides the necessary gating function for two remote stations. It is understood by addition of similar circuitry additional remote stations could be handled. The assigner circuitry is also designed to operate with either "return to neutral" or "pulse duration code" signalling systems. For purposes of this disclosure the pulse duration code system is employed. The operation of the assigner circuitry is the same for either case, only the external wiring differs.

The operation of the assigner circuitry will be discussed by the following situations:

(1) Station number 1 requests service with the system at rest.
(2) Station number 1 requests service at a control sequence in progress for station number 2.
(3) Station number 1 and number 2 request service simultaneously.
(4) The master station seizes the assigner circuit for initiating a control sequence with station number 1.

It should be understood that operation for other situations will be similar to those outlined with operation for the appropriate equipment for the station involved.

Figure 6:
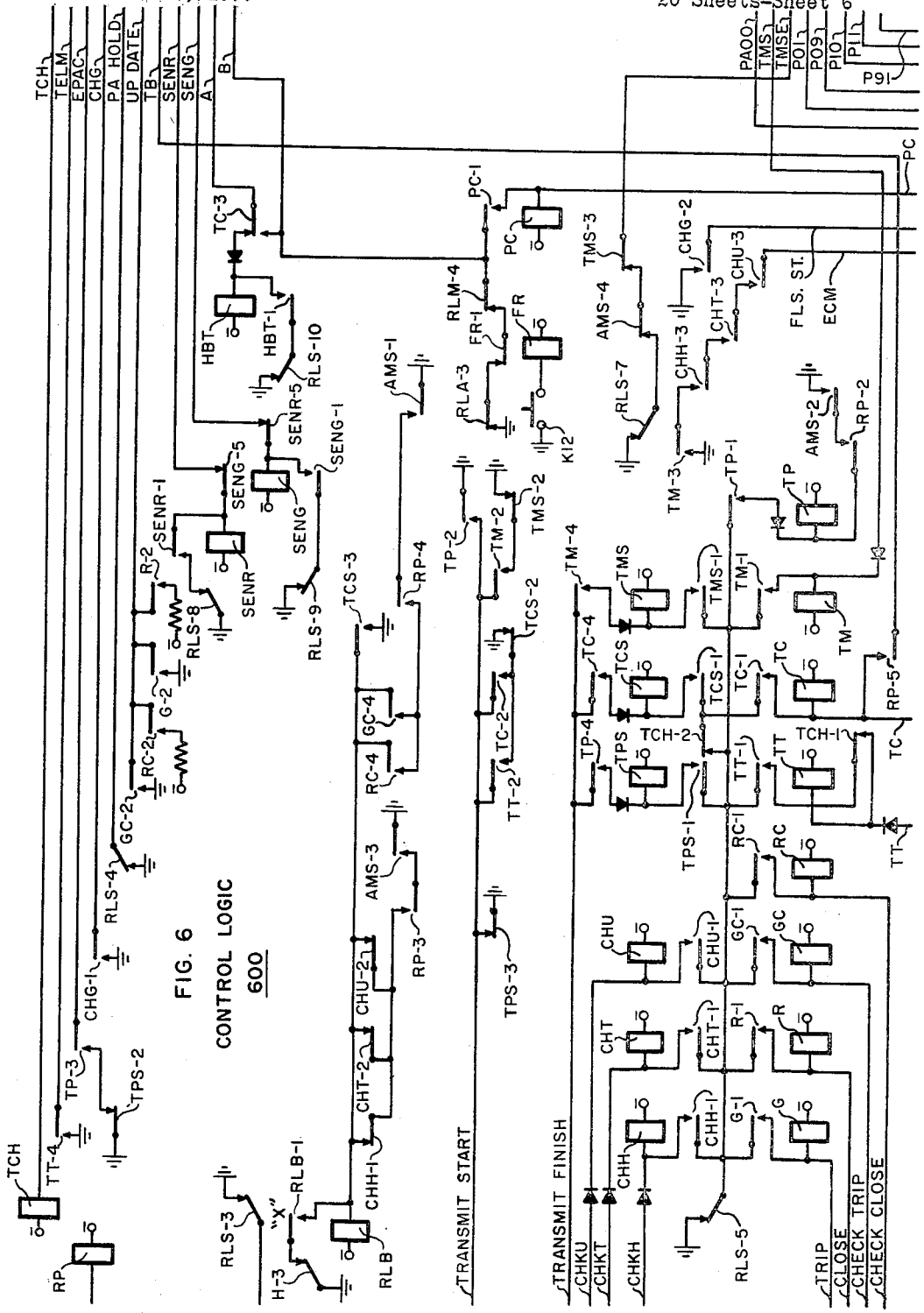

When station number 1 requests permission to transmit to the master station and the system is idle or at rest, ground is present from both station number 1 and station number 2 on the mark leads and relay RLS is operated from a ground extending from the logic circuitry of FIG. 6 at contact RLS 1. When the remote station 1 proceeds to transmist a message, ground will be applied on the "neutral" lead received at tone receiver 12 and conducted through contact C11 to the upper winding of relay A1 causing it to operate. Relay A1 will lock to ground to its own associated contact A11 and connect lead APR to lead APRE at contact A1-2. Operation of relay A1 at its contact A1-4 will cause relay B1 to operate. Relay B1 will lock to ground at its associated contact B1-1 and at its contact B1-2 light lamp L1, indicating that a message is incoming from station number 1.

At its contact B1-5 ground will be extended over the ASG lead to the control logic circuitry and operating ground will be extended at contact B1-6 to relay C1. Relay C1 on operation will close the "mark," "space" and "neutral" outputs from the tone receiver 12 at contact C1-2, C1-3 and C1-4 respectively to the associated inputs of the transceiver circuitry shown in FIG. 2. Operation of relay C1 will also extend at contact C1-1 ground to operate relay E1 through previously operated contacts A1-3 and non-operated contacts D1-4. Relay E1 will now operate extending ground at contact B1-3 over the transmit start lead to the control logic circuitry of FIG. 6 applying ground at contact E1-4 to the U lead extending to the encoder circuitry of FIG. 4 and at contacts E1-5 extending ground over the T lead to the same encoder circuitry. Operation of relay E1 will also at contacts E1-1 remove ground from the holding path for relay A1. Relay A1 can now restore and disconnect lead APR from lead APRE at contacts A1-2.

After completion of this sequence ground will be removed from the neutral lead at station number 1 and applied to the mark lead again. At this time ground will be momentarily removed from lead PPR by the transceiver circuitry shown in FIG. 5 in a manner to be discussed later. Removal of this ground will cause relay E1 to restore, removing ground from the transmit start lead and the U and P leads at contacts E1-3, E1-4 and E1-5, respectively. The assigner circuitry remains in this state until the message sequence has been completed at which time the control logic of FIG. 6 will remove ground from lead RLS in a manner to be discussed later and cause relay RLE to restore. When relay RLE restores, operating battery for relay B1 will be removed at contact RLE-2 and relay B1 will restore, removing ground at contact B1-2 from the station lamp L1 causing it to be extinguished. Ground will also be removed at contacts B1-5 from the ASG lead extending back to the control logic circuitry of FIG. 6. In a similar manner ground is also removed at contact B1-6 from relay C1 causing it to restore, disconnecting tone receiver 12 from the transceiver at contacts C1-2, C1-3 and C1-4. Ground will now be restored at contact RLS-1 in the logic circuitry of FIG. 6 causing relay RLE to reoperate and returning the assigner circuitry to its initial state.

If station number 2 were to request permission to transmit a message to the master station during a period of time during which a control sequence between the master station and station number 2 was in progress the initial state of the assigner circuitry would be such that relays C2, B2 and RLE would be operated with ground extending over the mark lead from tone receiver 12. When remote station number 1 would request permission to transmit, the ground would be removed from the mark lead and applied to the neutral lead causing relay A1 to operate in a manner previously described. Relay A1 will again close lead APR to lead APRE at which time the master station control logic circuitry of FIG. 6 would remove ground from lead RLS thus causing relay RLE to restore. Release of relay RLE will cause release of relay B2 and subsequently C2 by removal of operating battery first at contact RLE-2 and ground will now be applied to the RLS lead at the control logic circuitry of FIG. 6 in a manner to be discussed later, and relay RLE will operate and relay RLE reoperates, the operating battery would restore to contact RLE-2 providing the necessary operating path for relay B1 which in turn will apply ground at contact B1-2 to the station lamp L1 to indicate presence of an incoming message from that station. At the same time ground will be applied on lead ASG at contact B1-5. Additional operation will now be the manner similar to that previously described for an incoming message from station number 1 when the system was at rest.

Assuming station number 1 and number 2 request service simultaneously, the initial state will be such that relay RLE is operated, ground is present on the mark leads from tone receiver 12 associated with station number 1 and the mark lead and tone receiver 13 associated with station number 2. Both stations requesting permission to transmit an incoming message ground will be applied on the neutral lead associated with tone receiver 12 and on the neutral lead associated with tone receiver 13 by station number 2. These operations will then cause operation of relays A1 and A2 respectively, in a manner similar to that outlined previously and in turn relays B1 and B2 will operate. When B1 and B2 both operate simultaneously, the operating path for relay B2 will be removed at contacts B2-3 and B2-4 and contact B1-4 causing relay B2 to restore and allowing relay B1 to remain operated. The additional operating sequence to be similar to relay B1 to remain operated.

When the incoming message cycle initiated by station number 1 is completed, relay A2 will still be operated over ground extending from tone receiver 13 over the associated neutral lead. At this time then relay B2 will operate, applying ground at contact B2-2 to the station lamp L2 to indicate an incoming message from station number 2 and apply ground at contact B2-5 to the ASG lead. Relay C2 will now operate from ground extended at contact B2-6 causing the space mark and neutral leads from tone receiver 13 through to the transceiver at contacts C2-2, C2-3 and C2-4, respectively. Relay E2 will now operate from ground extended at contact C2-1 locking to holding path at contact E2-2. Operation of relay E2 will apply ground to the transmit start lead at contact E2-3 and to the U leads leading to the encoder circuitry of FIG. 4 at contact E2-4 and to the associated T lead leading to the assigner circuitry at contact E2-5. Operation of relay E2 will also remove the holding ground from relay A2 causing lead APR to be disconnected from lead APRE at contact A2-2. After this sequence has been completed ground will be removed by station number 2 from the neutral lead and reapplied to the mark lead associated with tone receiver 13. At this time the transceiver circuitry of FIG. 5 will remove ground from the BTR lead and cause relay E2 to restore, removing ground from the transmit start leads and the T and U leads previously indicated.

When station number 2 has completed the necessary message sequence to the master station, the master station control logic will remove ground from the RLS lead causing relay RLE to restore in a fashion similar to that previously described. Relay B2 will restore, removing ground from lamp L2 causing it to be extinguished and removing ground from lead ASG also causing restoration of relay C2. When relay C2 restores the tone receiver 13 will be disconnected from the transceiver after which time ground will be reapplied to RLS causing relay RLE to restore. Again the assigner circuitry is prepared to receive additional incoming messages.

When it is desired for the master station to seize the assigner to initiate a control sequence in connection with station number 1, the following sequence of operation will pertain. As previously, relay RLE will be operated and ground will be present on the mark leads from tone receivers 12 and 13, respectively. At this time the operator will depress a point select pushbutton such as K2 and apply ground on the assigner number 1 select lead. Extension of this ground will cause operation of relay D1. Operation of relay D1 in turn will cause operation of relay C1 by extension of ground at contact D1-3. Operation of C1 of course will complete the circuitry between the tone receiver 12 and the transceiver of FIG. 2 at contacts C1-2, C1-3 and C1-4 and the message sequence is completed, ground will be removed from lead RLS causing relay RLE to restore and in turn removing holding ground from relay D1 causing its restoration and in turn the restoration of relay C1. When relay C1 restores a tone receiver 12 will be disconnected from the transceiver. At this time ground will be reapplied to the RLS lead by the control logic circuitry, causing relay RLE to operate. In summary it may be noted that the assigner circuitry of FIG. 1 monitors the output communication facility and recognizes the request for permission to transmit initiated by one of the remote stations. Based on this request the assigner circuitry provides a gating function, permitting one and only one of the remote stations to transmit at a time, by connecting only one station to the transceiver input circuitry. It may be noted that if both stations wish to transmit sumultaneously the first station in the sequence has priority over the second.

The transceiver circuitry provides the transmitting and receiving logic in the instant control system. When functioning as a transmitter the circuit is primarily a parallel-to-serial converter and when functioning as a receiver it functions as a serial-to-parallel converter. It also provides constant ratio error checking for two-out-of-five or one-out-of-five codes when in its receiving mode of operation.

The transceiver consists of three portions. The keyer 200 shown in FIG. 2, the counting chain 500 shown in FIG. 5 and the code convert 1000 shown in FIG. 10. As the name implies the keyer keys or pulses the line relay, and the frequency shift tone equipment such as the tone transmitter 11 shown in FIG. 1 and also pulses the counting chain functioning as the transmitter. In the receive mode the repeater 200 is pulsed via the line relay or by frequency shift tone receiving equipment such as the tone receiver 12 shown in FIG. 1 and in turn again pulses the counting chain. The counting chain 500 of FIG. 5 performs the parallel-to-serial or serial-to-parallel conversion again depending upon whether it is functioning in its transmit or receive modes. The code converter has no function during the transmit mode of operation. During the receive mode it receives its information from the counting chain, temporarily stores the data until the entire message has been received and then after providing an error check simultaneously presents the complete message to the decode matrix circuit. If the receive message was in the two-out-of-five code, the output of the code converter 1000 will be in decimal form. If the message was of the one-out-of-five code type the output of the code converter will be in the one-out-of-five form.

The transceiver disclosed in the instant system uses a conventional return to neutral form of frequency shift keying message format and works in conjunction with three frequencies and frequency shift carrier facilities. Optionally the transceiver could be used in a pulse duration coding device. On this basis the transceiver could operate in conjunction with a D.C. line or a two frequency shift carrier. In either coding format the transceiver can be equipped to handle either a two digit message or a three digit message. In the instant system the two digit message technique is employed.

The two digit message structure allows the system to handle a maximum of 100 control supervisory and telemetry points while the three digit structure would permit the use of expansion up to a maximum of 999 points. The code for a two digit message, using a 74210 BCD (2 of 5 code) format, is the message structure utilized for all code point selection messages. The same message is returned to the originating station for point verification on a check before operate basis. The transmitting station operates the message by marking the selected transceiver inputs ground potential. All other UT and TT are open with no potential being applied. A ground potential on a UT lead will cause the transceiver to transmit a mark in that respective bit position in the unit digit portion of the message. An open or lack of ground potential on the UT lead will cause the transceiver to transmit a space in that respective bit portion. The TT1 to TT5 leads represent the first through fifth bit positions respectively in the tens digit portion of the message. Each information bit is interspaced by a synchronizing bit. The transceiver inserts the synchronizing bit as a neutral pulse. At the receiving station the transceiver will decode this message into a decimal output. The outputs of the transceiver at the receiving station are leads AU0 through AU9 and AT0 through AT9, representing the decimal unit digit A0 through 9 and decimal ten digit 0 through 9, respectively. The one-out-of-five coded message is used for command or "activate" codes which are transmitted to the remote station and the master station as a result of the operator depressing a control pushbutton, such as K6, K8 or K9 as shown in FIG. 12. The functions are such as trip, close, point check, etc. The coded messages representing point status, such as open or close, transmitted from the remote to the master to update the point indication display are also in this one-out-of-five coded format.

Operating description of the transceiver will be as follows:

Assume that a message in a two-out-of-five code is to be transmitted to a remote station ground will be received from the logic circuitry over the transmit start lead. Relay T1 of FIG. 5 will operate locking to a holding path at its associated contact 220 to extend back through contacts RST5 and TSP4. Operation of relay T1 will disable the code converter by disconnecting the leads to the code converter at contacts T-10 through T-19 at the same time leads from the decoders of FIGS. 4 and 9 will be connected to the counting chain at the same contacts and the keyer will be enabled by extension of ground at contacts T-4. Relay P of FIG. 2 will now operate and in turn cause relay A to operate and transmit at contacts A1 and leads to the tone transmitter 11 of FIG. 1 to cause the sending of a "space" and "mark" transmissions. Relay P will now restore and through previously closed contacts A3 will cause relay B to operate and likewise relay C1 of FIG. 5 in the counting chain. Operation of relay C1 will cause the counting chain to look for the presence of a ground marking on lead UT1 at contact C1-3. Assuming now since the message being transmitted was 65 there is no ground present on that lead and relay SM will not operate. The pulsing relay P will again operate causing relay C to operate over a path extended through previously operated contact B-2 and at contact B-1. At contact C1 this will cause transmission of a space signal by the tone transmitter and relay AL1 will be caused to operate over a path extending through contacts AL2-1, AL3-1, T-2, via lead RRM and contact C3 by ground extended at contact C1-3.

Again relay P will restore causing relay C to restore and relay C2 to operate. At this point a neutral signal is again transmitted and lead UT2 will be tested for the presence of ground. The presence of ground on this lead will cause operation of relay SM over a path extending over ground applied at contacts U2-2 in the encoder of FIG. 4 through contacts T-18, C2-2 the remainder of the counting chain, contacts CL-3 and T-8 to the relay. When relay P restores, relay C will reoperate in combination with the previously operated. Relay SM will cause the transmission of a "mark" signal at tone transmitter 11 of FIG. 1. Relay AL1 will restore when its operating path is broken at contact AL2-1.

The pulsing relay P will again restore causing relay C to restore and relay C3 to operate. At this time a "neutral" will again be transmitted and the UT3 lead will be tested for the presence of ground. Relay AL2 will now restore. The P relay will now reoperate causing the reoperation of relay C and the resultant transmission of a "space" marking to the tone transmitter. Relay AL1 will now reoperate.

At the conclusion of the operation relay P will restore causing the restoration of relay C and the operation of relay C4. A "neutral" signal will now be transmitted and lead UT4 will be tested for the presence of ground. Detecting the presence of ground on this lead relay SM will reoperate. Relay P will now reoperate causing the reoperation of relay C and because of the presence of previously operated relay SM a "mark" signal will be transmitted. Relay AL1 will now restore. The pulsing relay P will again restore causing the restoration of relay C and operation of relay C5. A "neutral" signal will be transmitted. The UT5 will be tested for ground. Detecting none, relay SM will restore. Relay P reoperates. Relay C reoperates and a "space" signal will be transmitted. Relay AL1 will operate. Once more relay P will restore causing restoration of relay C and operation of relay D6 causing the transmission of a "neutral" signal and testing lead UT6 for the presence of ground or battery.

A similar sequence of events will continue until the entire counting chain has been operated so that all leads have been tested, at this time relay P upon reoperation will cause reoperation of relay C and the transmission of a "space" signal. Relay P will now restore causing restoration of relay C and operation of relay CL indicating completion of the counting chain. A "neutral" signal will be transmitted and relay SM will operate. When relay P restores relay C will restore and a "mark" signal will be transmitted. At this time relay TSB will operate and cause ground to be extended on the T lead to the relay SM and cause relay RST to restore by opening its holding path at contact TSP-2. The sequence will cause relay T1 to restore as well as relays C1, C2 through C10 and CL. Ground will also be removed from lead PTR, from lead RLS1/5 and cause the restoration of relays A, B, C and SM. Relay TSP will now also restore removing ground from the T lead. In this manner the mode of transmission required at this specific address will have been sent by the tone transmitter via appropriate communication links to all remote stations.

Operation of the receive mode is similar to that of the transmit mode. Incoming signals of the "space," "mark," "neutral" in the tone receiver associated with the remote station transmitting incoming signals to the master station will cause operation of relays SM or N shown in the keyer FIG. 2 that are indicative of a "space," "mark" in the "neutral" signals. At the start a "space" signal coming in will cause relay N in FIG. 2 to operate, in turn replacing ground at contact N-1 on lead RDR to operated relay C1. Assuming the incoming number is 11 the next received digit will be a "mark" indication which will cause operation of relay M which will in turn extend ground over lead R and through contacts TH, CL3 and down through the counting chain and contact T19 to extend ground over the counting chain to relay C1. The next incoming transmitted signal will be a "neutral." Signal relay M will restore, relay N will operate and operate relay C2. Since the next incoming signal will be a "space," additional CU relay will be operated at this time even though the operation of relay C2 prepared a checking path at contacts C2-2. This chain operation will continue through the counting chain until relay C6 has been operated and another "mark" signal will be received causing relay N to again operate extending a ground over lead R through the counting chain and through associated contact C6, C3 and contact T14 through relay CT1 of the code converter so that the tens and units combination marked in the code converter are "unit one" and "tens one," the representation of the number 11.

After this number has been registered the counting chain will continue to operate until relay CL operates, creating a path to relay RSP which will complete the operation of the transceiver in response to the incoming message.

The number received of course is marked in the appropriate contacts of the code converters of FIG. 10 and once there, it is extended to the point equipment of the command circuitry as required.

If the operator wishes to reset the system at the master station, operation of key K1 at the system reset key shown in FIG. 6 will operate all the appropriate releases replacing the system in its quiescent state and will cause the ground to be replaced on the "space" lead at the remote station. After approximately 150 milliseconds relay S will operate removing ground from relay RJ in a manner similar to that shown in FIG. 2 for operation of contact N–2.

Figure 11:
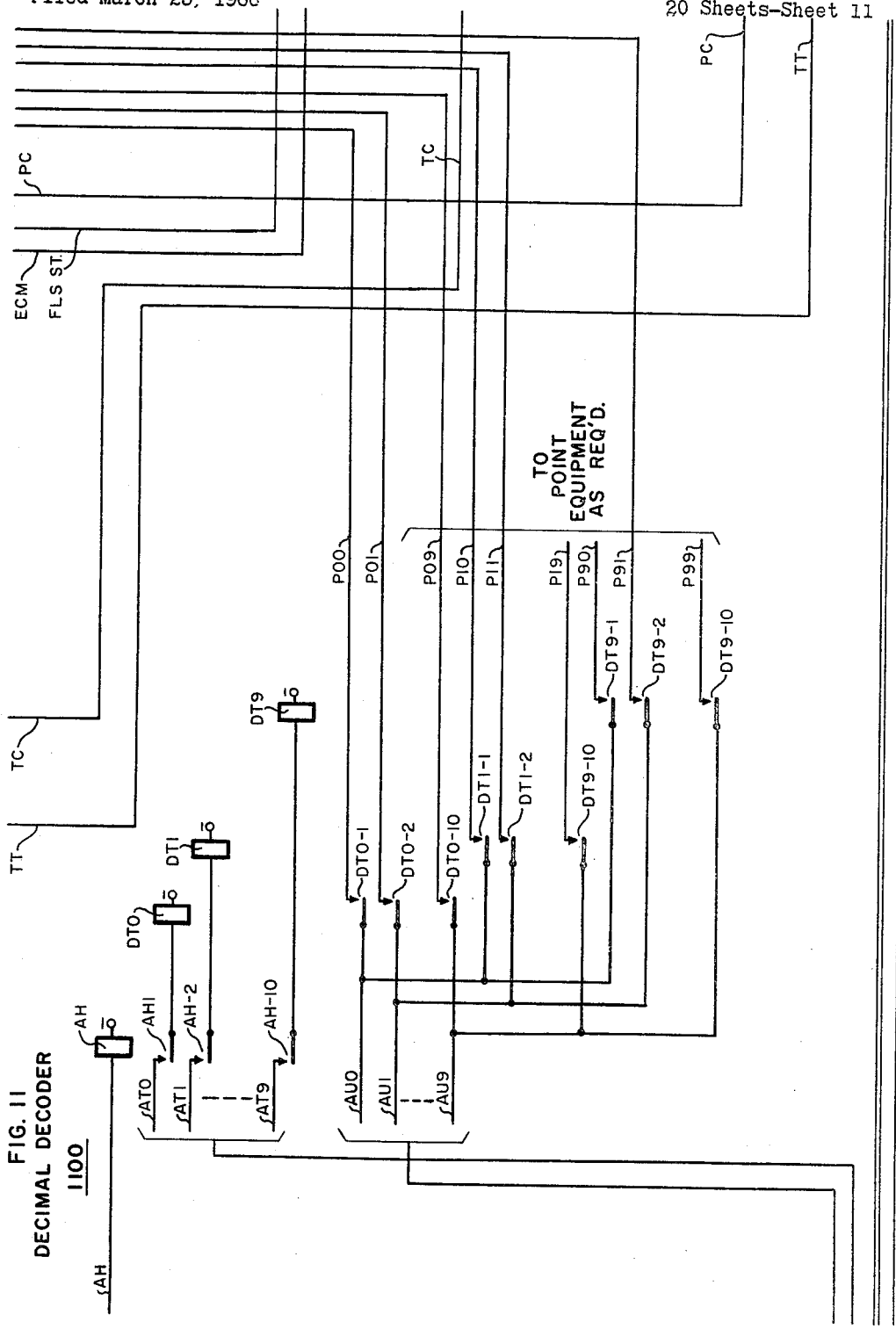

The decimal decoder input decode matrix circuit of FIG. 11 accepts the output of the transceiver circuitry as ground markings on one of a group of ten leads designated AU0 through AU9 and as a ground marking on one of a group of leads designated AT0 through AT9 as well as a ground marking on lead AH. The decode matrix will convert these three inputs into a single output to form a ground marking on one group of one hundred output leads designated P00 to P99. For convenience, only leads designated P00, P01, P09, P10, P11, P19, P90, P91 and P99 have been shown. The decode function for up to one hundred points has been shown, however as is obvious it could readily be expanded by the tens selection method in connection with the AH relay to increase this to 1000 points.

The AH relay operated in response to ground received from the transceiver circuitry enables the decode matrix 1100. This relay will operate on each read pulse received from the transceiver. When relay AH is operated relay DT0 through DT9 are connected to the tens output of the transceiver. One of these relays will then be marked by ground placed on the appropriate lead by the transceiver. Operation of these relays will then extend at their associated contacts, ground through to the point equipment based on markings received from the transceiver. This extension is made at contacts such as BT0–1 through BT0–10 that would be associated with relay DT0 etc. The end effect of this matrix is to place a single ground marking to be transferred by selection of a point equipment circuit of FIG. 7 or FIG. 8.

The decimal input decode matrix only functions after a two-out-of-five message is received. It performs no action in the transmit mode of operation or after the receiving of a one-out-of-five coded message. This function was performed by the circuitry of FIG. 10. If for example the code "00" is received, ground will be placed on leads AH, lead AT0 and lead AU0 during the readout for the transceiver. In response to this operation relay AH will operate completing a path at its associated contact AH1 to relay AT0 which in turn will operate. When relay AT0 operates it will complete a path for the ground extended in transceiver over lead AU0 at its associated contacts BT0–1 and extend the ground via the output P00 to the associated point equipment of FIG. 7. Approximately 150 milliseconds later ground will be removed from leads AH, AT0 and AU0 causing relays AH and AT0 to restore and removing grounds from lead T00. Approximately 300 milliseconds later the control logic in either the master station or remote station will remove ground from the transceiver reset lead and the encoder release lead and transmit start lead. This action will cause relay RST to restore which in turn will cause the counting chain and the keyer to return to normal. At this time relay RLS will restore in the associated logic circuitry and then the code converter will restore to normal if in the operated mode. At this time ground will be reapplied to the mark lead and removed from the space or neutral leads. Relay RJ1 will reoperate, ground will be reapplied to the reject lead leading to the control logic after which ground will be applied to the transceiver reset leads and the release encoder leads causing restoration of relay RST and relay RLS and applying ground to the transmit start lead at the master station to the transmit message lead at the remote station.

The one-of-five encoder 400 is primarily a buffer register for coded control messages to be transmitted. By receipt of momentary ground pulses, one of its "T" or tens input leads and one of its "U" or units input leads, the encoder will mark the input of the transceiver circuitry of FIG. 5 with the coded message and remain in this mode until that message is transmitted. After which the transceiver will remove the locking potential on the encoder and the encoder will then restore. A maximum of 25 control or command codes may be handled by the encoder. For the sake of brevity only three of the "tens" relays have been shown, and only three of the "units" relays have been shown. In describing the operation, it will be understood that normally ground is extended from the control logic circuitry at contact RLS3 through RST4 of the transceiver circuitry of the FIG. 5 to provide holding ground for the relays of the encoder 400.

Assuming that the control message represented by the number "21" is to be encoded, operation is as follows. When the operator wishing to generate a control message operates the trip operation key K6, ground will be placed on leads ET2 and BU1 momentarily, relays P2 and U1 will operate locking to ground extended over the path previously outlined at contact T2–1 and U1–1 respectively, and at their associated contacts T2–2 and U1–2, ground will be extended to the transceiver circuitry of FIG. 5, for the utilization by the transceiver in transmitting the message to the remote station. When that message had been transmitted ground will be removed from lead RLS1–5 by control logic of FIG. 6, causing relays T2 and U1 to restore. When these relays restore the coded markings to the transceiver will be removed by removal of ground at contacts T2–2 and U1–2 respectively.

Figure 9:
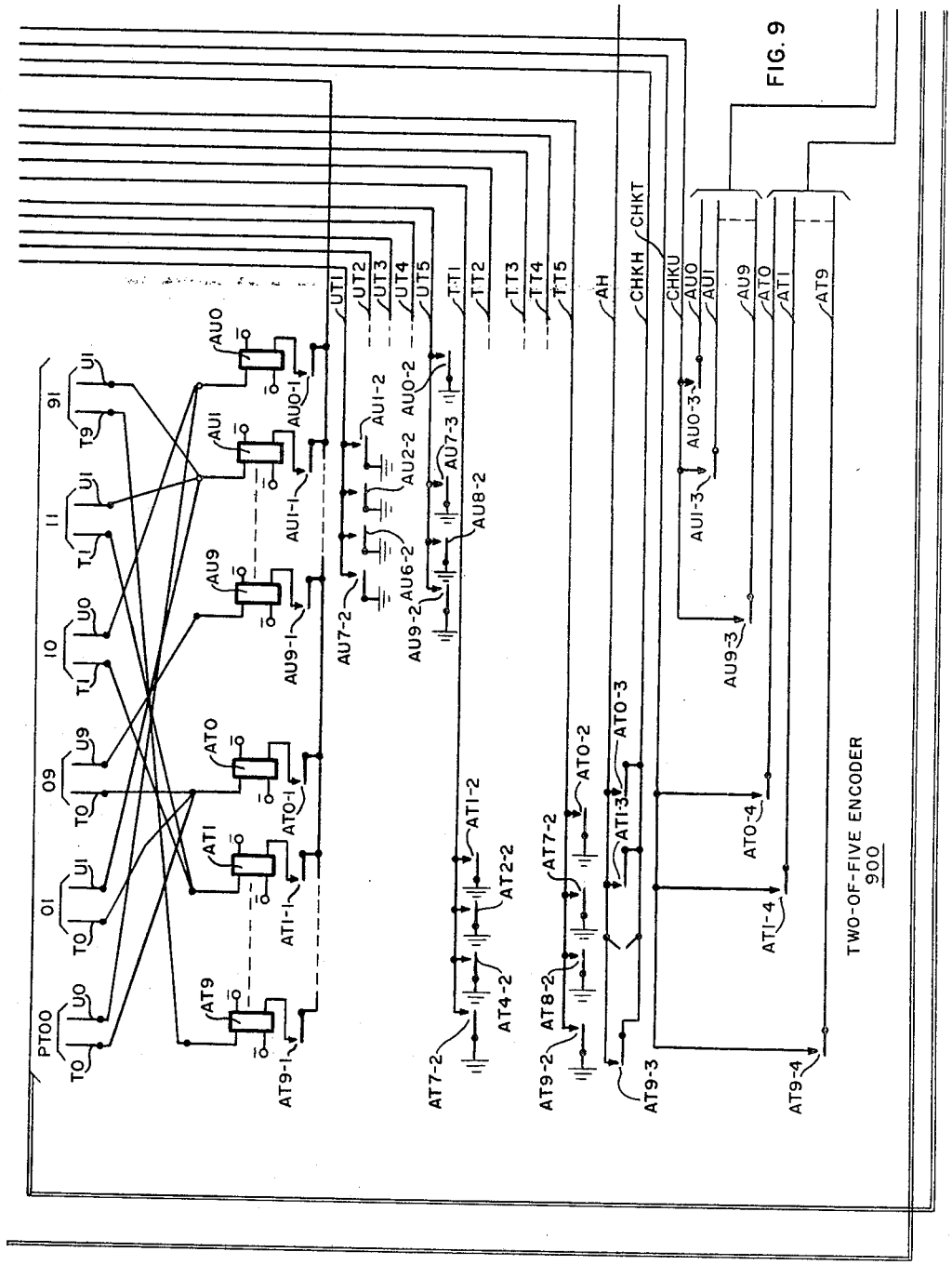

The two-of-five encoder 900 shown in FIG. 9 is functionally located between the transceiver circuitry and a point selection equipment. The two-of-five encoder receives information as a momentary pulse of ground potential on one of the group of leads designated 30, T1 through T9. The "U" represents the units digit and the "T" the tens digit. At the master station the information comes from the point selection key such as K2. At the remote station the information comes from the point supervisory circuit. The output of the two-of-five encoder 900 is wired to the transceiver via leads designated UT1 through UT5, TT1 through TT5.

In operation, the selected relays of the two-of-five encoder will place ground on appropriate leads for extension to the transceiver circuitry. The code matrix of FIG. 9, remains locked until the same message is returned by the remote station when the encoder referred to is in the master station and vice versa. When the transceiver receives the "return" message it decodes and will apply ground during its read output to the AU0 through AU9 and AT0 through AT9 leads. If the return message agrees with the original encoded message then the ground potential will be extended through the two-of-five encode circuitry to leads CHKU, CHKT and CHKH. If this is accomplished then the associated relays in the control logic circuitry operate, the check before operate" test is completed and the message sequence will continue. If the return message did not agree with the originally encoded message, ground will not be returned to the leads CHKU, CHKT and CHKH. The system will then reset after the "read" output of the transceiver is finished. The encoder as disclosed can handle a maximum of 100 codes. By addition a simple hundred selection group this can be extended to a thousand points.

Operation of the two-of-five encoder 900 is as follows. Assume that the code "00" is to be encoded. Initially ground will be present on the RLS2–5 lead. The operator will then operate a point selection pushbutton such as K2 applying ground via the associated T and TU leads AT0 and AU0. Each of these relays will operate locking to ground over their holding contacts AT0–1 and AU0–1. Ground will now be extended over leads TT1 and TT3, the operating paths will be extended to leads CHKT. The operation of relay AU1 will be effective to cause the extension between the operating path to lead CHKU and extend ground via leads UT1 and UT2. In this manner, a coded message is extended to the transceiver of FIG. 5 and preparation for receiving the necessary check information is prepared in FIGURE 6.

When the same message is returned from the remote station indicating receipt of the correct transmission before the operating function commences, ground is applied by the transceiver through FIG. 10 to leads AT2 and AU1 during the "read" output of the transceiver. In this manner, ground is applied to the checking leads CHKH, CHKT and CHKU and to the appropriate operated contacts of relays AT2 and AU1 and there extended to the checking relays of FIG. 6. Approximately 150 milliseconds after the end of the read output of the transceiver, ground will be removed from lead RLS2–5 causing relays to restore. When these relays restore, ground will be removed from the checking leads and the TT and UT leads extending to FIG. 5. After another 15 milliseconds, ground will be extended from the transceiver circuitry over the RLS2–5 lead and removed from AT2 and AU1 leads of FIG. 10.

The output of the two-of-five encoder 900 of FIG. 9 is supplied to the transceiver circuitry of FIG. 5 is supplied in a 74210 code form. The following listing of markings and their decimal equivalents will indicate the form this code takes.

| Decimal equivalent: | Relays operated |
|---|---|
| 1 | 2 and 1 |
| 2 | 3 and 1 |
| 3 | 3 and 2 |
| 4 | 4 and 1 |
| 5 | 4 and 2 |
| 6 | 4 and 3 |
| 7 | 5 and 1 |
| 8 | 5 and 2 |
| 9 | 5 and 3 |
| 0 | 5 and 4 |

The above coding is used in both the units and tens groups of relays.

The one-of-five input decode matrix 1100 provides a decoding function on messages coded on a one-of-five basis. It is basically a 5 x 5 x 1 matrix however additional modules could be added to increase its capabilities. In the present system only the 5 x 5 martix is provided. The decode matrix 1100 has twenty-five outputs designated as C11 through C15, C21 through C25, C31 through C35, C41 through C45 and C51 through C55. For convenience sake the outputs C11 through C15, C21 through C26 and C51 through C55 have been shown. These outputs are strapped to appropriate function relays in the logic circuitry of FIG. 6. The relay BH operates in response to a "read" command from the transceiver circuitry to enable the decode matrix. When relay BH is operated leads BT1 through BT5 will be connected to relays BT1 through BT5 respectively to extend the appropriate ground markings to the logic circuitry.

Looking back at the total operation now, the decode matrix code markings from the counting chain portion of the transceiver as shown in FIG. 5 are extended to relays CT1 through CT5 and CU1 through CU5. Operation of the appropriate ones of these relays based on the coding received, conducts grounds upon "read" commands from the transceiver from the tens group to the units group via contacts BH1 through BH5 to operate relays BT1 through BT5 as required and thus extend coded markings based on ground extended to the contacts of relay CU1 to the functional relays. Likewise incoming markings on a decimal basis are extended via leads AT1 through AT0 and AU1 through AU0 to the decimal input decode matrix circuit of FIG. 11.

If the operator desires to determine the status of all points at a remote station the operator will operate a station check key associated with the station desired. For example to check the points of the first remote station, key K4 in the point equipment shown in FIG. 8 will be operated. This key associated with the code "11" will operate the two-of-five encoder 900 shown in FIG. 9 to register the code 11. Ground will also be applied to the assigner number one, select lead to the tone receiver associated with station number one and at the same time actuate the transceiver to transmit the code to the remote station. In a manner previously described the remote station will return the code for checking purposes. Then in response to the code return from the remote station the code will also be extended to the one-of-five encoder 400 shown in FIG. 4 and in turn actuate the transceiver to transmit this code to the remote station and thus, perform the scan of all lines in the remote station transmitting the appropriate codes sequentially back to the master station. These codes will be recorded as data status on the point escutcheon lamps associated with the points in the remote station.

Telemetering of the value at a specific point in the remote station is accomplished by selecting the point by way of the keys included on a point equipment instruction shown in FIGS. 7 and 8 and operating the telemetering key K9 shown in FIG. 12. When the later key is operated, a ground is placed on lead TT to operate relay TT in the control logic 600 which in turn will place ground on the transmit start lead. This places the transceiver in the transmit mode and also actuates the logger control 340 of FIG. 3. In response to the telemeter command code the remote point selected transmits back in analog form the information requested which will be picked off the tone receiver of FIG. 1 and conducted to the telemetry equipment of FIG. 3.

If for example the point selected was that shown in FIG. 7 identified with code 00 the relay MS00 would have been operated and would have connected the appropriate scanner 301 to the analog transmission path and to the A to D converter 320. If the A to D converter were to previous receive a start command from the logger control 340, then the contact MS00–7 indicating that the desired response was to be reported in watts would have been closed between the logger control and the buffer storage. When the incoming signals are received and conducted to the appropriate scaler 301 the A to D converter will convert them from an analog form to digital form and further transmit them to the buffer storage 330. The contacts MS00–5 and MS00–6 will also have been closed when point "00" was selected and therefore the marking of the point selected and the classification of information required from the selected point would also have been recorded in the buffer storage and this information will be added to the digital information received from the A to D converter 320. All of this information will then be stored in buffer storage 330 until the entire message is received at which time the final received signal will operate the logger control to indicate the finish of message at which time the logger control 340 will operate upon the buffer storage 330 to transmit the information stored therein to the logger 350. Logger 350 was previously activated by logger control 340 so that it might receive the information stored in the buffer storage. In this manner individual logging of information associated with any point equipped for telemetry may be recorded. The logger, logger control, buffer storage and A to D converter as well as the scaler circuits are all well known devices, it is only the control thereof that forms a portion of this invention. For example the logger may be an electric typewriter, magnetic tape, or other such device and the buffer storage may take the form of magnetic storage, relay storage or other well known form. The A to D converter may be similar to that disclosed in the copending application of Bishup and Jakubas, Ser. No. 420,588, filed Dec. 23, 1964. The scaler circuitry may be simply a preset rheostat to assure the application of the proper relative values from the tone receiver to the A to D converter 320.

The master station control logic provides the sequencing control necessary to integrate the operation of the many different control aspects of the master station. Since the instant system provides three basic functions, control, supervision, and telemetering, the three primary modes of operation are control message sequence, supervisory message sequence, and telemetering mode. Each of the three modes can be broken down further as follows: the control message sequence which may be utilized for controlling an "on" or "off" point, for controlling a changeable point, selecting a telemetering point, or initiating a station scan check. The supervisory message sequence may be utilized in reporting an authorized change of status, reporting an unauthorized change of status, or reporting a point status in response to either a station scan or point check. In the telemetering mode variable frequency telemetering via the same communication channel as that used for controlling and supervision is used. With slight modification a communication channel separate from that used for control and supervision may be provided.

The supervisory function has priority over the other two functions. If a point changes state while the system is in the control or telemetering operation the system will reject the lesser priority function and immediately proceed to report the change in point status. If telemetering were being performed via separate communication channels there would be no need to reject the operation as it would in no way effect the supervisory function.

The master station control logic 600 in conjunction with the point selection equipment 700 provides the optional feature of "alarm inhibit." Without the "alarm inhibit" feature, report of any status change regardless of whether or not it was authorized, it would always be accompanied with an audible alarm signal and a flashing instruction lamp. This would also be true for any station scan or point check report.

When the alarm inhibit feature as disclosed herein is provided the station scan and point check reports are not accompanied with an audible alarm signal or a flashing instruction lamp unless the new point status does not agree with the point status previously registered. An authorized change of status, i.e., a change of status which is the result of a previous control action taken by the operator will also be reported without initiating an audible alarm or flashing lamp subject to the following exceptions: It is the first "status report" following the control action; or, the new status is different than that previously registered. If the status were the same as previously registered this would be an indication that the point underwent a double operation such as a circuit breaker retripping on a line fault and the status report is in fact an alarm. In this case, an audible signal and a flashing lamp included in equipment 700 would be given. All unauthorized point status changes are reported as alarms and will thus be accompanied by an audible signal and flashing lamp.

Operation under the following operating sequences will be discussed.

(1) Operator initiates a control message sequence with the system in the previous idle state.

(2) Remote station reports an unauthorized change of status (alarm) with the system in the previous idle state.

(3) Remote station reports an authorized change of status with the system in the previous idle state.

(4) Remote station reports an unauthorized or authorized change of status with the system in a previous control sequence with either the same or different stations.

The operating sequence of station scan, point check and telemetering will be discussed later.

The first sequence will be that wherein the operator initiates a control message sequence while the system is in its idle or quiescent state. Assuming that the operator wishes to control point "00" he will first operate key K2 at the point equipment shown in FIG. 7. This will place ground on lead TMS. Relay TM and the logic circuitry of FIG. 6 will operate, closing ground to the transmit start lead at contact TM2, and lead APRE at contact TM–4 at which time the point address message is transmitted. After the point address message has been transmitted by the transceiver circuitry the operation of relay TSP at its associated contacts TSP5, shown in FIG. 5, extends a ground to the logic circuitry to operate relay TMS to a path extending through contact TN–4. Operation of relay TMS will remove ground from lead transmit start at contact TMS2. Ground will then be removed from lead TMS by virtue of the removal of ground at contact TMS2.

At this point the remote station will return the point address transmitted for the check before operated test. At this time ground will be closed to leads CHKH, CHKT and CHKU as a result of the return message agreeing with the originally encoded message. The associated relays CHH, CHT and CHU will operate. Closure of this chain along with previously operated relay TM where the functional selection keys are shown. Approximately 100 to 150 milliseconds later ground will be returned from the transceiver at its associated contacts RST–7 to operate relay RP. Approximately 15 milliseconds later relay RP will operate. If relays CHH, CHT and CHU are not all operated as would be the situation if the return message did not agree with the original encoded message this action would not take place.

The operator will now depress the control pushbutton associated with the function desired. Let us assume for the moment that it is desired to trip a circuit breaker at the distant point. Function key K6 shown in FIG. 12 would be operated. This operation will place a ground on lead TC that was present on lead ECM assuming that the checking code returned from the remote station was correct. It will also be extended to the transmit start lead and extended to the point register by virtue of operation of relay TC which operated in response to the operator depressing key K6. At this time the control message associated with coding in this instance 21 will be transmitted to the remote station by the transceiver circuitry in the manner previously described. At the end of the message ground is closed to the transmit finish lead operating relay TCS, and removing ground from the transmit start lead. This time relay RLB will operate by virtue of a path completed at contact TCS–3. When relay RLB operates it will remove ground at its contact RLB–2 causing relay RLS to restore in turn removing grounds from the assigner release leads, transceiver reset leads, release encoder leads and the PHA hold lead. At this time relays TC, TCS, TMS, CHT, CHH and CKU and TM will all restore. Restoration of relay TM will remove ground from lead APRE and opening up on the checking chain consisting of the relays CHH, CHT and CHU, will remove ground from lead ECM. After its release period relay H will restore, after approximately 50 milliseconds causing relay RLB to restore which was held operated over a path extended to its own contact RLB–1 and contact H3. When relay RLB restores ground will again be returned to relay RLS at contact RLB–2 causing relay RLS to reoperate. Operation of relay RLS is effective to return ground at contact RLS–2 to relay H causing it to reoperate. Ground is again returned at this time to leads RLS assigner, reset transceiver, release encoder and PA hold. At this time the sequence is complete and the system is returned to normal.

Discussing now the reporting of an unauthorized change of status (alarm), to an on condition by the remote station when the system is in a previous idle state. An incoming message is received at the master station. Ground will be placed on lead ASG causing operation of relay AMS. This will cause removal of ground at associated contacts AMS–4 from lead TMSE leading to the panel equipment to prohibit an operator from starting a control sequence at this time. The "permission to transmit" message will be sent to the remote station as a result of action taken by the assigner circuit and the remote station will reply to the master station with the point address of the point requiring service following the last bit of the point address message. At this time ground will momentarily be closed at contact RST–7 in the transceiver circuitry to relay RP causing relay RP to operate. Ground is now extended through previously operated contact AMS–2 and contact RP–2 to relay TP causing it to operate. Operation of relay TP will extend ground to the transmit start lead at contact TP–2 and complete a ground to lead EPAC at contact TP–3. After the usual 15 milliseconds delay relay RP will restore. At this time the point address message will be retransmitted to the remote station for the "check before operate" test. Ground will now be extended from the transceiver circuitry at contact TPS–5 to the logic circuitry causing the operation of relay TPS through previously operated contacts TP–4. Relay TPS in turn will remove ground at contact TPS–2 from the EPAC lead at TPS–3 remove ground from the transmit start lead. After 6 to 8 milliseconds ground will be removed from the transmit finish lead. At this time the remote station will check the return point address transmitted by the master station with the originally encoded point address message.

The point status message will be transmitted now, and after the last bit, ground will be placed on the open lead, operating relay G. After relay G is operated ground is extended at contact G2 to the update lead to the line equipment of FIG. 7 and relay CHG will be operated by virtue of ground applied to it at contact G3. Operation of relay CHG will apply ground to lead CHG to the point register at contact CHG1 to the flash start lead at CHG2. As will be noted the flasher circuitry of FIG. 12 will be placed in operation by this ground extension as will the audible alarm circuit of FIG. 12.

Approximately 150 milliseconds later ground will be restored to lead RPA momentarily for a period of approximately 15 milliseconds and relay RP will operate as will relay RLA in turn. The latter operates over a path extending through contacts RP1 and G4 locking to holding ground at its associated contacts RLA–1. Relay RLS will now restore removing ground from the release assigner, reset transceiver, release encoder and PA hold leads. Relay H will restore. A holding path at contact RLS2 is opened in turn to release relays TP, TPS, G, CHG and AMS in sequence and in turn will cause the removal of ground from lead ASG, extension of ground to lead TMSE and the removal of grounds from leads CHG, flash start, and the removal of ground from the update lead. Approximately 50 milliseconds after relay H restored relay RLA will restore and relay RLS will reoperate in turn reoperating relay H. Ground will again be extended to the release assigner leads, the reset transceiver lead, the release encoder lead and the PA hold lead in a manner similar to that previously outlined. This completes this particular sequence of operation.

The next sequence described will be that of a remote station reporting an authorized change of status with the system in a previous idle state. In a manner similar to that described previously ground will be applied to the ASG lead and relay AMS will operate removing ground at its associated contact AMS4 from the TMSE lead to the point equipment prohibiting initiation of a command message by an operator at the master station. The permission to transmit message is sent to the remote station as a result of action initiated by this assigner circuit of FIG. 1.

The remote station will then reply to the master station with the point address of the point requesting service. This will cause relay PA00 of FIG. 7 to operate. Ground will then be extended from the point selection equipment relay PA00 causing relays HBT and SENG to operate. After approximately 150 milliseconds ground will be extended at contact RST–7 from the transceiver circuitry to relay RP causing it to operate. In response to operation of relay RP, TP will operate over ground extended through contacts AMS–2 and RP–2. Operation of relay TP will extend ground at contact TPA–2 to the transmit start lead. At about this time relay RP will restore and the point address code will be returned by the transceiver to the remote station for the check before operate test. When this is completed ground will be extended to the relay TPS via the transmit finish lead and contact TAP–5 in the transceiver to cause operation of relay TPS. Operation of relay TPS will remove ground at contact TPS–3 from the transmit start lead. After another period of 6 to 8 milliseconds ground will be removed from the transmit finish lead.

At this time the remote station will check the return point address code with the originally encoded message and if both on agreement the remote will transmit the "point status" message. Following the last bit of the point status message, assumed at this time to be "close," ground will be returned on the close lead from the code converter of FIG. 10 to cause operation of relay R. Operation of relay R will extend resistance battery to contact R–2 to the update lead extending to the point equipment. The change relay CHG will not operate at this time, because relay HBT is still operated, thus neither the flash start or the audible alarm circuitry of FIG. 12 will function. After approximately 150 milliseconds ground will be extended at contact RST–7. Now the transceiver circuitry will extend ground to relay RP causing the operation of relay RP. When relay RP operates it extends ground at its associated contact RP1 through previously operated contact R–4 to relay RLA causing it to operate locking to ground to its own contacts RLA–1. The subsequent release of the equipment and return to the original state is similar to that previously detailed in connection with the prior sequences. It should be noted that if the previous control command given to the point reporting had been "trip" and the previous point status registered as "close" then the status reply of "close" for this example would not have been an authorized state and the change relay would then operate.

When a remote station reports an unauthorized or authorized change of status with the system in a previous control mode of operation with either the same or a different station the sequence of operation of the control logic of FIG. 6 is as follows. If the report is from a different station ground will be closed via lead APR to relay RLM if the report is from the same station as being communicated with ground will be removed from reject lead at contact RJ1 in FIG. 2 causing relay REJ to restore and apply ground at its associated contacts REJ1 to the relay RLM. Under either situation relay RLM will operate and cause relay RLS to restore when its operating path is opened at contact RLM–4. When relay RLS restores ground is removed from the RLS encoder lead, the reset transceiver, the PA hold lead and the release assigner leads. Relay H will restore. Ground is extended by reject lead from the keyer of FIG. 2 to cause relay REJ to operate, and ground is removed from the lead APR.

When relay REJ operates ground is removed at contact REJ1 from relay RLM causing relay RLM to restore. Operation of relay RLM will now cause the operation of relay RR and in turn the reoperation of relay RLS, immediately thereafter relay H will operate. The operation of relay RLS will extend ground to leads RLS, encoder, reset transceiver, PA hold and release assigner.

After approximately 10 milliseconds ground will be closed to ASG lead via the assigner circuitry and cause the operation of relay AMS in the logic circuitry. After this ground will be removed from lead TMSE at contact AMS-4. At this point a permission to transmit message will be sent to the remote station and the ensuing sequence will be the same as that outlined previously for a remote station reporting the idle condition of the master station.

The remote station equipment as shown in the block diagram of FIG. 18 is similar to the master station shown in FIG. 19. Many of the component circuits of the remote station are identical or nearly so to those used in the master station. The remote circuitry of the remote station number 1 shown in FIG. 18 is similar to circuitry utilized in the master station of FIG. 19 include the transmitter and receiver 1801 and 1802, the keyer 200′, the 1/5 encoder 400′, the counting chain 500′, the 2/5 encoder 900′, code converter 1000′, and the decoder 1100′. Their operation consequently has previously been discussed.

Those portions of the remote station that are distinct from the master station circuitry include the remote station control logic 1300, the station check scanner 1500, the point control equipment 1700, and the remote control point 1600. Their operation is discussed below.

The means in which the remote station circuits that are like those used at the master station connect to the remote station circuits that are peculiar to a remote station is readily apparent upon examination of the circuits and reference to the block diagrams of FIGURES 18 and 19.

Figure 13:
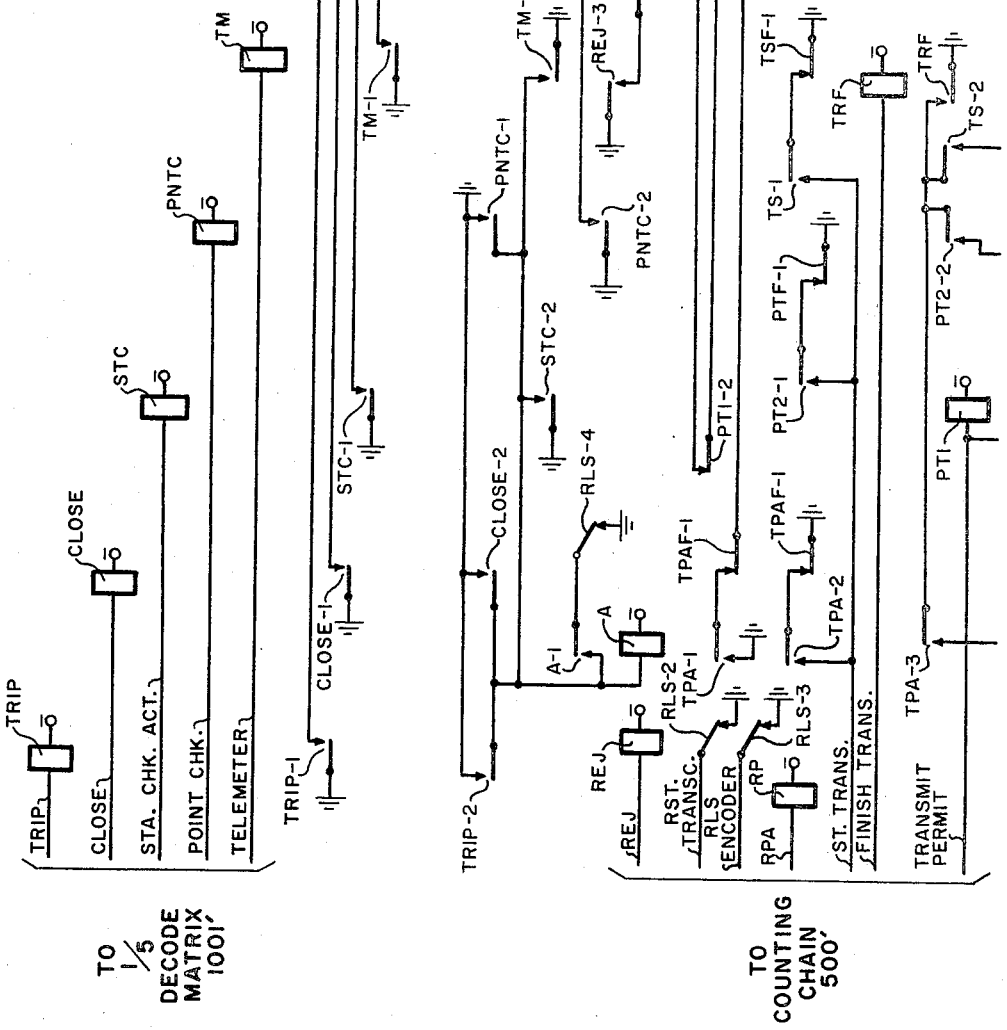
FIGS. 13–17 are to be arranged.
Figure 14:
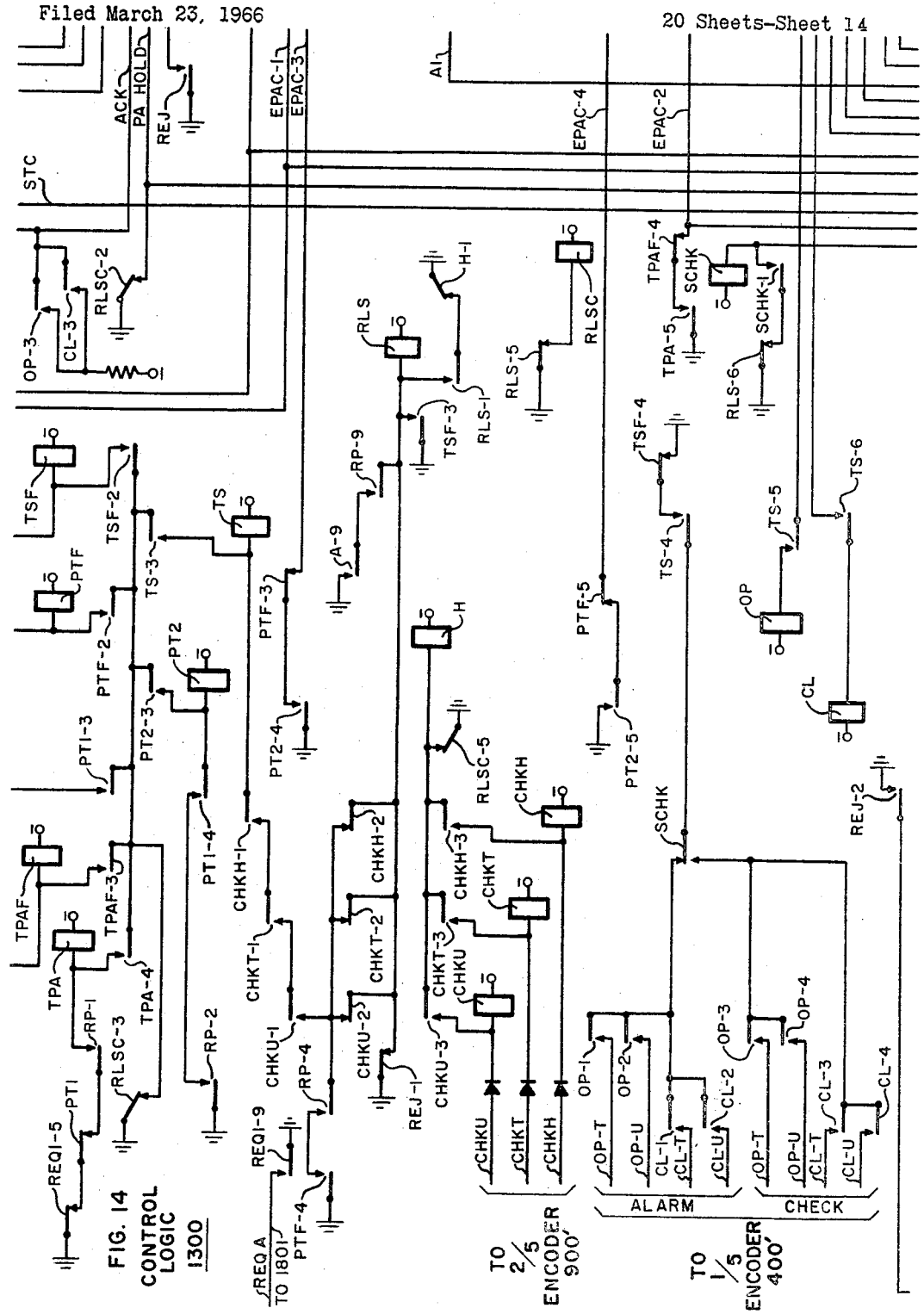

The remote station control logic 1600 shown in FIGS. 13 and 14 comprise the sequencing control necessary to integrate the operation of the many different switching units at the remote station of the system. As indicated previously the present system provides three basic functions, that of control, supervision and telemetering. Thus the three primary modes of operation are the control message sequence, the supervisory message sequence and the telemetering mode.

The control message sequence may be employed for controlling an on-off point, controlling a tap changer point, selecting a telemetering point or initiating a station scan or point check.

The supervisory message sequence may be utilized for reporting an unauthorized change of status, for reporting an authorized change of status or reporting a point status in response to either a station scan or point check. The telemeter sequence is used for the provision of variable frequency telemetering, and may be either the same or separate from that used for control and supervision.

The supervisory function has priority over the other two functions. If a point changes state while the system is in a control or telemetering operation the system will reject the lesser priority function and immediately proceed to report the change in point status. If telemetry were being performed via a separate communication channel there would then be no need to reject the operation as it would in no way effect the supervisory function.

The remote station control logic will provide the report of any status change regardless of whether or not it was authorized. If not authorized it will be accompanied by an audible signal and a flashing escutcheon lamp at the master station. This will also be true for any station scan or point check report. That portion of the control logic shown in FIG. 14 will provide all the necessary sequencing for operation of the remote station. The portion shown in FIG. 13 provides the common control command equipment for the common point addresses for both telemetering and supervisory control functions.

The best understanding of the operation of the remote station control logic will result from reference to FIGS. 13 and 14 and their assocated drawings in connection with the following descriptions describing several different operating sequences. Sequences described will be that of a remote station receiving a control message initiated at the master station, a remote station reporting a status change of a point device to the master station when the system is idle and a remote station reporting a point status change when the system is previously in an operating sequence.

An operator at the master station who is to initiate a control message will depress the point escutcheon pushbutton associated with the selected points. This would be a key such as K2. Ground will be received at the remote station from the counting chain 500′ at the control logic via lead RPA causing operation of relay RP. Relay RP via its contact RP1 will extend ground to relay TPA causing it to operate. Ground will now be applied to the start transmit lead at contact TPA-2 and to lead EPAC1 and EPAC2 at contacts TPA-1 and TPA-5 respectively. This will cause return of the point address to the master station for the provision of the check before operate test. After a period of .15 millisecond ground will be removed from lead RPA and relay RP will restore. Ground will now now be closed to the transmit finish lead by the counting chain 500′ causing operation of relays TRF and TPAF which will lock to ground at its associated contact TPA-3. Ground will be removed from leads EPAC-1 and EPAC-2 and the transmit start lead at contacts TPAF1, TPAF4 and TPA-2 thus removing ground from the transmit start lead at TPA-2.

Approximately 150 milliseconds after the dispatcher or operator has depressed the control pushbutton, ground will be extended to lead TRIP causing operation of lead TRIP of FIG. 13. Ground will also be closed momentarily to lead RPA from the counting chain 500′ to operate relay RP. Relay A operates to a path extending from ground through contact TRIP-2 locking to ground at its own associated contact A1.

Relay RLS will now operate to a path extending from ground through contacts RP-3 and A2 locking to ground at its associated contacts RLS1. After removal of ground from lead RPA relay RP will fall and subsequently relay TPA and TPAF will restore when ground is removed from their holding path by restoration of relay RLSC. Relay RLSC restored after its holding path at contact RLS5 was broken. Relay H will now restore, after a slow to release period relay H will also remove the holding path for relay RLS at its contacts RLSC-4 and cause relay RLS to restore and relay H will then reoperate, thus completing the sequence and restoring the control logic to its normal state.

The sequence during which the remote station reports a status change of a point device when the system is previously in the idle state is described in the following sequence. In response to a status change relay IND of the point supervisory equipment shown in FIG. 17 will operate causing the release of the MEM or memory relay and subsequently the operation of relay G in the point supervisory circuit. Operation of relay G will extend ground at contact G1 via the alarm priority reset lead causing operation of relay REQ1 which will extend ground at its associated contact REQ1-6 via REQA lead to the tone equipment 18A. This will cause the transmission of a neutral signal to be sent to the master station which in turn will cause the master station to send a permission to transmit code to the remote station. A command when received will be decoded by the remote station equipment and ultimately ground will be closed to the permission to transmit lead during operation of relay PT1.

Relay PT1 will lock to ground at its associated contact PT1-3 and relay REQ1 will restore when ground is removed at contact PT1-1. Ground will now be removed from the alarm reset at contact PT1-2 and momentarily close to lead RPA. After approximately 15 milliseconds, relay RP will now operate closing ground at contacts RP-2 through previously operated contacts PT1-4 to relay PT2. Operation of relay PT2 will place ground on leads EPAC3 and EPAC4 at contacts PT2-4 and PT2-5 respectively as well as to the transmit start lead PT2-1. Relay RP will now restore. The encoder will now generate a point address code to the two-out-of-five encoder 900' for transmission to the master station. At the end of the transmission of the address code, ground will be applied to the transmit finish lead causing operation of relays TRF and PTF to a path extending through previously operated contacts PT2-2. Ground will then be removed from the transmit finish lead and subsequently remove leads EPAC3 and EPAC4 and transmit start at contacts PTF-1, PTF-3 and PTF-5.

The master station will now reply to the remote station by transmitting the same point address message for the check before operate test. At this time ground will be closed to leads CHKU, CHKT, and CHKH from the two-out-of five encoder 900' as a result of the return message agreeing with the original encoded message. Ground will now be closed to lead OP or lead CL, on operation of the point address relay PAR in the point control equipment of FIG. 17. At this time relays CHKU, CHKT and CHKH operate. Ground will now be applied momentarily from the counting chain 500' to lead RPA causing operation of relay RP after which relay TS will operate. TS would not operate if CHKU, CHKT and CHKH were not all operated as might be the case if an improper address were returned. Relay RP will now restore and either relay CL or relay OP will operate. Operation of either of these relays will cause the extension of battery to lead ACK leading to the point control equipment and ground will be extended to leads CLT and CLU, or leads OPT and OPU, leading to the one-out-of-five encoder 500'. The status report message will now be transmitted on the one-out-of-five code basis and at the end of the message ground will be closed to the transmit finish lead after which relay TRF and TSF will again operate removing ground from the transmit start lead and then after a period of 10 milliseconds removing ground from the transmit finish lead. Ground will now be removed from the OP or CL, T and U leads and relay RLS will operate. Relay RLSC will restore followed by removal of ground from the reset transceiver, release encoder and PA hold leads. Relays PT1 and PT2 will restore as will relays TS, TSF, OP or CL, and relays CHKU, CHKT, CHKH and relay PTF. After a 50 millisecond delay ground will be applied to the reset transceiver lead, release encoder lead and the PA hold lead. Relay RLSC will now reoperate completing the sequence.

When the remote station has a point status change to report with the status previously in an operating sequence the following sequence of operation will be pertinent. Initially ground will appear on alarm reset lead and remove from the reject lead causing relay REQ to operate and relay REJ to restore. Ground from the transmitter will be extended to lead REQA and ground will be removed from the telemeter lead if previously in use to reset the transducer circuitry. Ground will be extended to lead RSTC to reset the station check circuits if they are previously in use and remove from the lead RLS. INT. RLY. if it is previously in operation. Relay RLS will operate causing relay RLSC to restore releasing all relays previously held by RLSC. After 50 milliseconds relay RLSC will reoperate at which time a permission to transmit command will be received from the master station. This will cause the extension of ground to the transmit permit lead and then cause operation of relay PT1 after which the sequence will be the same as for that of the remote station reporting a status change when the system is in its idle state.

Figure 15:
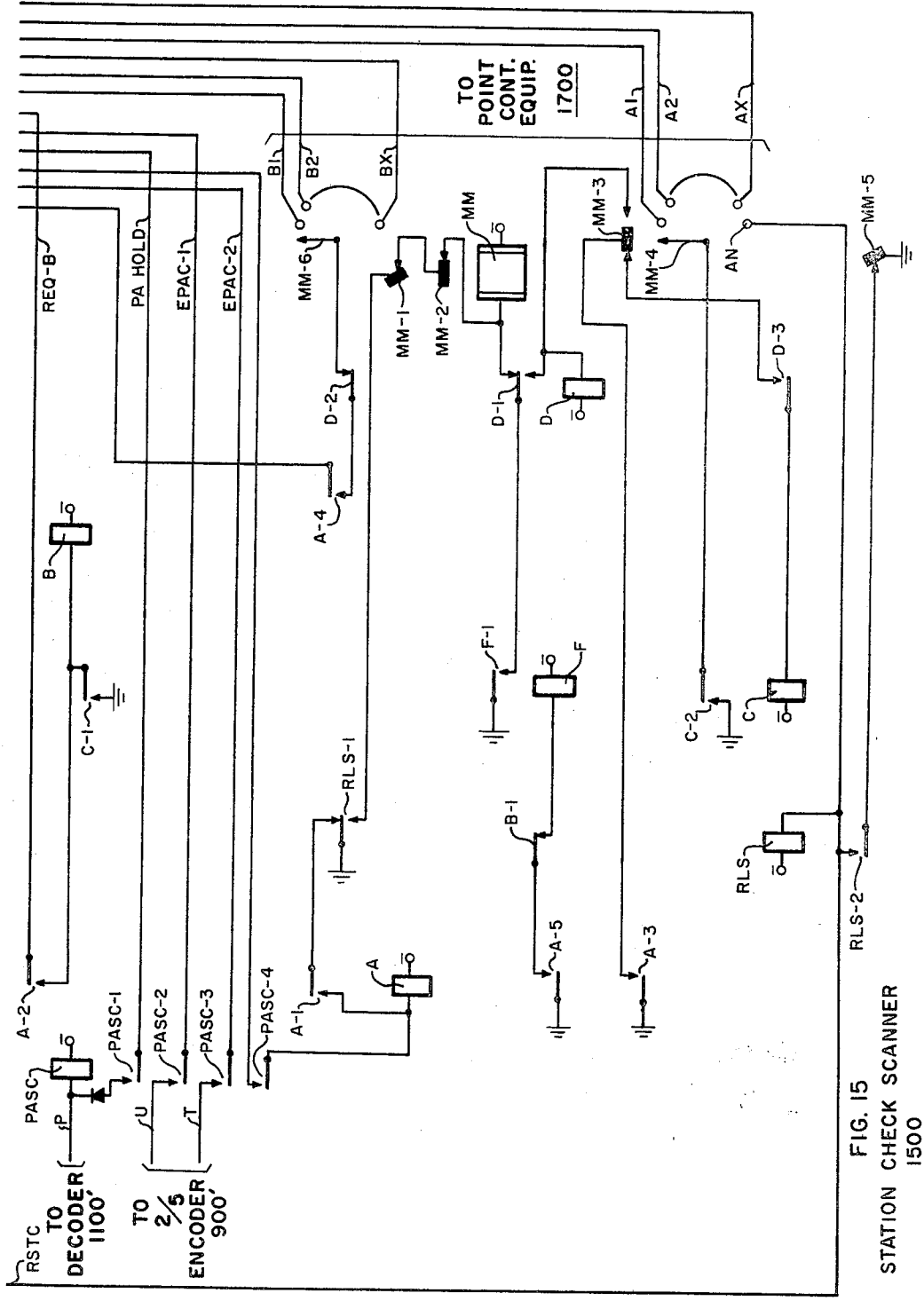

The station check scanner 1500 shown in FIG. 15 provides a means for routining the system points to verify their status located at a remote station. It basically consists of a scanning device, a rotary switch MM and control equipment to start pulsing and release the station check unit. The scanner will sequentially scan all points associated with the remote station and automatically start a status reporting sequence. If during the station check a true alarm at any of the points occurs, the scan will stop. The scanning will automatically be restarted after that alarm condition is reported to the master station.

The two-of-five code and the one-of-five code used in the two message formats associated with the operation of the circuits, will provide station check addresses, and station check command addresses, respectively.

Operation of the station check scanner is best understood by the following description of its operation taken in connection with FIG. 15. Assume that there are no more than 50 points in the station. The station check address on a two-out-of-five code basis is received and decoded at the remote station. At this time ground from decoder 1100' is applied on lead P causing operation of relay PASC. Operation of relay PASC will extend ground at contacts PASC-2 and PASC-3 and relay G to the two-out-of-five encoder 900'. This will cause encoding of the address which will be transmitted to the master station for comparison sake. After completion of this sequence ground will be removed from leads EPAC1 and EPAC2 and subsequently removed from the leads U and T extended to the encoder 900'. The master station will then send the station activate command and ground will be applied to the station check lead (STC) through previously operated contact PASC-4. Relay A will be operated causing relay A to lock to ground at its contact A1 and in turn operating relay F by virtue of extension of ground at contact A5. Operation of relay F will extend ground at its associated contact F1 to the motor magnet MM. When the coil energizes, it creates an operating path to relay D through interrupter contacts MM3. Operation of relay D will break the operating path at contacts D1 to motor magnet MM causing it to restore and step to position 1, and operate relay C over contact D3.

During the interim ground was removed from lead STC and from the PA hold lead causing relay PASC to restore. Operation of relay C will place ground on lead A1.

The change of status function is simulated by releasing the point relay MEM with the remote station requesting permission to transmit. At this time ground is closed to lead REQB causing the operation of relay B. Operation of relay B will cause relays F and B to restore to open the holding path for relay F at contact B1 which in turn will remove the holding ground from relay D at contact F1. Ground is extended from lead B1 of the line equipment by way of wiper MM6 and contacts D2 and A4 to relay SCHK of the control logic prior to release of relay D2. After the restoration of relay D, relay C will restore removing ground at its associated contact C2 from the A1 lead extending to the point equipment. After the permission to transmit command is received, the status report message will begin. After completion of the report ground will be removed from lead REQB causing relay B to restore, and in sequence relay F will reoperate, the motor magnet MM will become energized but does not step, relay D operates over a previously outlined path and at this time the motor magnet will cause the wipers MM4 and MM6 to step to the second set of bank contacts such as A2 and B2 respectively. Relay C will reoperate by completion of the path through contacts D3 and ground will be extended over lead B2 from the point equipment via wiper MM6 over previously outlined path to relay SCHK. Ground will also be placed on lead A2 through contact C2. Relay B will again operate over ground extended via the lead REQB and the cycle will continue in the same manner until the last point such as 1710 has finished reporting, or one of the points being interrogated has an alarm to report.

In the first instance, when the motor magnet has caused the wipers MM4 and MM6 to step to the last position, relay C will operate extending ground via contacts C2, wiper MM4 and bank contact AN to relay RLS causing it to operate. Operation of relay RLS will cause relay A to restore by opening its holding path at contacts RLS1 and the motor magnet will cause the rotary switch to return to its normal position in a self interrupted manner. When this occurs, ground will be removed from bank wipers AN and the release relay will restore. Under the other circumstance where an alarm condition has been reported by a point, ground will be applied by the control logic at contacts REJ-2 to lead RSTC, causing the subsequent as before operation of relay RLS will cause, relay A to restore and cause the motor magnet to step its associated wipers to their normal position. At this time, relay RLS will restore and the sequence will be completed. Obviously, to continue the station scan, it will be necessary for the operator at the master station to again initiate the station check scan, after noting the alarm condition.

The point control equipment 1700 has as its primary function the monitoring of contacts on the supervised device in a remote control equipment to detect the change in the status of the device. This contact may be the normally open or the normally closed, but it cannot have more than two states. The circuit does not detect intransit conditions. The circuit will detect momentary changes if the following are met.

(1) If the momentary condition is an opening of the supervised contact. The condition must exist for at least 20 milliseconds.

(2) If the momentary condition is a closure of the supervised contact. The condition must exist for at least 35 milliseconds.

The point control assembly as shown is equipped to monitor from 1 through 10 points. The circuit provides facilities for sequentially gating each point in the supervisory system in case of the simultaneous occurrence of more than one alarm or change in status of the supervised devices. Relay IND directly monitors the supervised contact and at all times indicates the status of the device. Relay MEM monitors relay IND in effect for change in status. Relay MEM is normally operated and has a release time of less than 100 microseconds. When relay IND either operates or restores, relay MEM will release during the transfer time of the IND contacts. Relay MEM is reoperated by the supervisory system after the point has reported the status change.

In addition to its supervisory function the point supervisory circuit also provides for selective access of interpose relays for control and transducer outputs for telemetering. Therefore each individual point address can have associated with it any one or all three functions of point supervision, point control and point telemetry.

The point supervisory equipment operates in conjunction with the remote station control logic to provide the alarm inhibit feature. That is the inhibiting of an audible or a visual alarm signal when a detected point change of status is the result of the control logic. The alarm signal will also be inhibited if the status report is the result of a station scan or point check unless the new status disagrees with the previously registered status.

Figure 16:
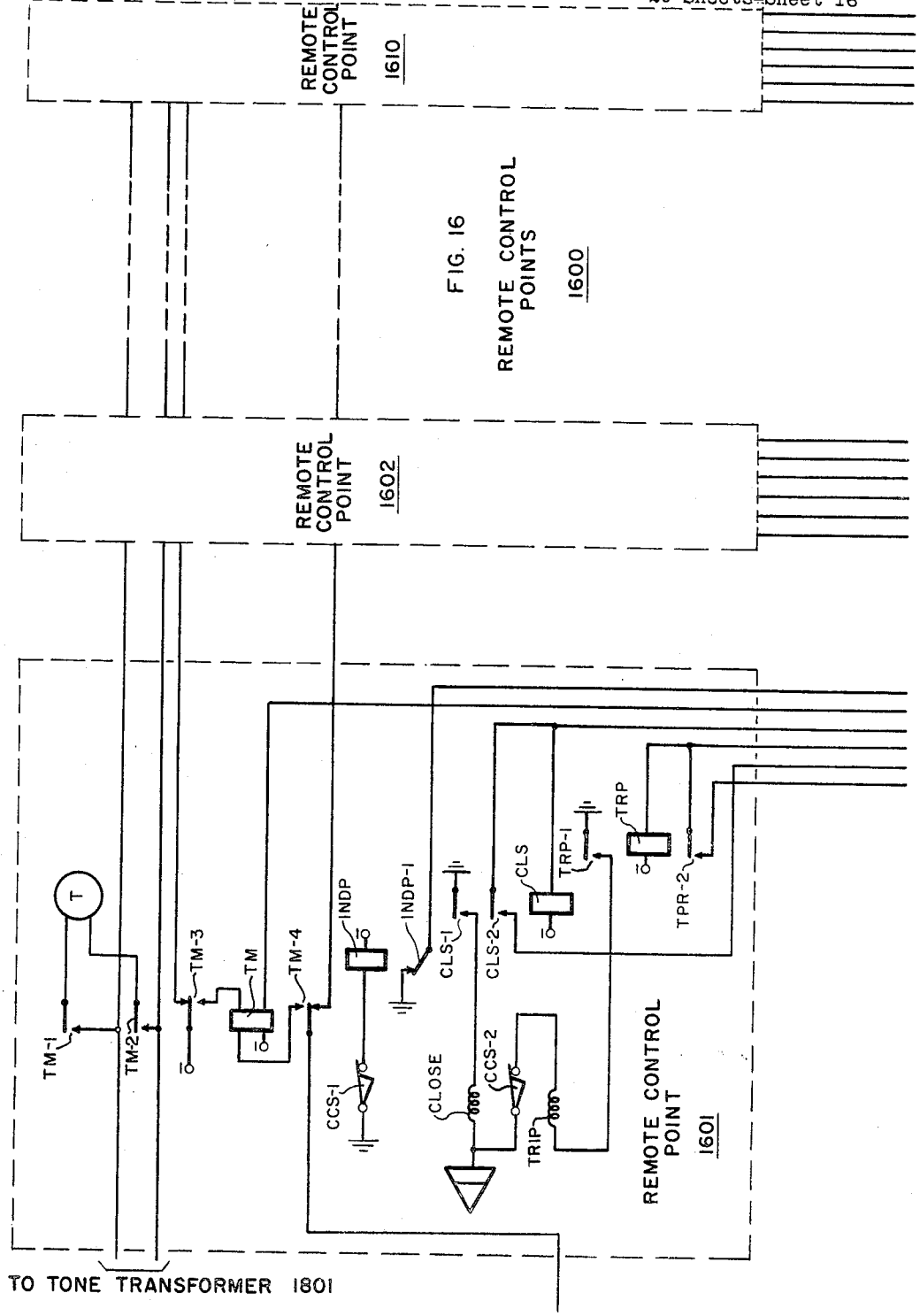

The detection of the change in status of a supervised point from a normal to an abnormal state (assuming that an open contact represents a normal state and closed contacts represent the abnormal state) will be understood best by reference to the following description taken in connection with FIGS. 16 and 17 of the remote station. Ground will first be applied to lead S as a result of closure of the supervising contacts in response to this ground relay IND will operate removing ground from lead LKB and applying it to lead LKA. Normally operated relay MEM restores as a result of the transfer action of the contacts on relay IND. Relay G will now operate assuming that no other relay G in other control equipment groups is operated. Ground will be applied to the alarm RS lead during this period a request for permission to transfer will be transmitted from the remote station or the master station. Receiving this permission ground will be applied by the control logic to the leads EPAC3 and EPAC4 and conducted through contacts G2 and G3 respectively to the T and U leads associated with the point in operation and extended to the two-of-five encoder 900'.

At this time, the point address message associated with the point providing the control indication will be transmitted to the master station. Ground will be removed from leads EPAC and EPAC4 consequently from the T and U leads to the encoder and the master station will retransmit the point address code to the remote station for check before operate verification. If the return message is identical to the original message stored in the encoder matrix ground will be applied to lead P causing operation of relay PAR. Ground will be extended through contacts PAR8 to contact INC4 to lead OP and battery will be applied by control logic to the ACK lead. This will be effective to cause the reoperation of relay MEM and in turn will cause relay G to fall. At this time ground will be removed from the alarm RS lead and the point status message will be encoded and transmitted to the master station. The remote station will then reset and return to its quiescent state. In the course of resetting ground will be removed from lead PA hold and battery will be removed from the ACK lead causing restoration of relay PAR which in turn will remove ground from lead OP and lead B1. The above description is pertinent only to the report and supervisory change associated with one of the points at the remote station.

The following sequence will describe the selection of a control and supervisory point and operating or tripping the associated circuit breaker and reporting the resultant change of status. Assuming that an open supervisory contact represents the open or trip state of the circuit breaker a closed supervisory contact represents the closed state of the circuit breaker and a closed contact will apply ground potential to lead S. Also assuming that the trip and close interposed relays are interlocked to the circuit breaker the supervisory contacts and the IND relay that is the trip or close interposed relays when operated will electrically lock to leads LKA or LKB respectively. The interposed relays are indirectly sealed to the circuit breaker therefore in the initial state the supervised contact associated with the circuit breaker will have its contact closed and relays IND and MEM will be operated. The operator at the master station will depress the point selection pushbutton associated with the position and an encoded point address message will be sent to the remote station after which ground will be applied to lead P associated with the selected point causing relay PAR to operate. Ground will then be applied to the OP lead. Ground will be applied to control leads EPAC1 and EPAC2 and removed from lead P. Ground will be extended through the contacts PAR6 and PAR7 and relay PAR to the T and U leads associated with the position and thence to the encoder. The point address message will then be encoded and transmitted back to the master station. After this sequence is completed ground will be removed from leads EPAC1 and EPAC2 and subsequently from the encoder. At the master station the point address message received from the remote station will be compared with the original encoded message and if both are identical the associated point register is selected and the control pushbuttons are activated. The operator in this case will depress the trip pushbutton K6 and transmit code 21 to the remote station. This will cause closure of ground to lead TRIP which will be extended through contact PAR1 to the trip interpose relay TRP which will operate and electrically lock to lead LKA.

Approximately 100 milliseconds later the remote will reset to its quiescent state at which time ground will be removed from lead TRIP and momentarily removed from lead TA hold causing removal of ground from lead PRP extending to the interposed relays. Relay PAR will restore and ground will be removed from lead OP. As a result of operating the trip coil the circuit breaker of the associated supervisory contacts will now operate to their open position. At this time ground will be removed from lead S causing relay IND to restore. In turn ground will be removed from lead LKA and applied to lead LKB, relay MEM will restore as a result of the transfer action of the contacts of relay IND and relay G will operate applying ground to the alarm RS. The remainder of the sequence will be the same as described in the simple reporting of a supervisory change.

The status report is to be made as a result of a point check operation and the sequence will be very similar to that described in the preceding example. After the point has been selected and the acknowledgement lamp is lit in the escutcheon at the master station the operator will depress the point check key such as K8 sending out the code 25 instead of operating the trip pushbutton in the previous example and as a result the transmission of the point check command ground potential will be applied to the ACK lead which will cause relay MEM to be shunted down. Relay MEM will restore and operate relay G causing a similar operation of that previously outlined.

The status report is to be transmitted as a result of a station check scan operation. The scanner circuit of FIG. 15 will apply ground potential on lead A associated with each point in sequence that is requesting that point to report its status as a result of ground potential on lead A relay MEM will shunt down restoring and operating relay G causing a similar operation as in the past.

The remote control points shown in FIG. 16 are typical of the type found in the system similar to the instant. However it must be understood that they are only typical and that other variations could be employed.

Referring to the remote control point 1601 which is representative of a circuit breaker for use in a power system, the circuit breaker is normally in its closed position and during this condition the closed coil switches 1 and closed coil switch 2 abbreviated as CCS1 and CCS2 respectively are normally closed. CCS1 maintains ground on relay INDP maintaining them in an operated condition and in turn extending ground back to the point control equipment via lead S to maintain relay IND in the operated condition. Upon receipt of a command to shift to the trip condition via lead TRIP relay TRP will operate extending ground to the trip coil to actuate it causing the opening of switches CCS1 and CCS2. Subsequently ground will be removed from the S lead at contacts INDP1 and a supervisory indication will be provided at contacts TRP2 back over lead LKB extending to the point control equipment. The operator at the master station then transmits the closed command to reset the circuit breaker and receipt of ground by relay CLS via the CLO lead will extend ground at contact CLS1 to the closed coil of the circuit breaker extending supervision back over lead LKB at contact CLS2 and restore ground by virtue of the closing of switch CCS1 to relay INDP which in turn will reoperate to extend ground via the status or S lead to the point control equipment.

If a telemetering command is received ground will be extended via the telemeter lead from the point control equipment to relay TM causing it to operate locking to battery at its own contacts TM3 and at contacts TM4 locking to a holding path extending back to the control logic circuitry of FIG. 14. Operation of relay TM will also connect the individual transducer T at contacts TM–1 and TM–2 to leads extending to the tone transmitter 1801. The analog output of the transducer T will be converted into a tone for transmission to the master station. As will be noted the leads extending from the tone transmitter to the transceiver, and the holding leads for relay TM are linked through subsequent remote control points 1602 through 1610. Because of the circuitry employed only one remote control point can be actuated to telemeter associated information back to the master station at a given time.

What is claimed is:

1. A control system including a communication link, connected to said link at least one remote station including a plurality of controllable devices each operable in at least two modes, a master station including selection means operated to select one of said devices and to further select the mode of operation of said selected device, point indicating means associated with said devices operated to indicate each mode of operation of said devices, receiving means connected between said communication link and said point indicating means operated in response to signals received from said remote stations over said link to operate said indicating means to indicate the mode of operation of each of said devices and alarm means comprising: alarm signaling means; and alarm detection means including circuit connections to said point indicating means, and to said selection means, initially conditioned in response to said selection means, and further conditioned in response to said point indicating means, said alarm detecton means further including status reporting means comprising at least first, second, third and fourth status reporters each connected to said receiving means, said alarm detection means operated in response to said initial and said further conditioning and operation of said receiving means to operate said alarm signaling means, and each of said status reporting means operated in response to receipt of a different signal by said receiving means to report the modes of operation of said controllable devices.

2. A control system as claimed in claim 1 wherein said selection means include: point selection means operated to select one of said devices; command means operated to select the mode of operation of said selected device; and point checking means operated to varify the mode of operation of said selected device.

3. A control system as claimed in claim 1 wherein said alarm signaling means include: an audible signaling device; and visual control means including circuit connections to said point indicating means operated to visually modify said point indicating means.

4. A control system as claimed in claim 3 wherein said alarm signaling means further include: first cancellation means operated to render said audible signaling device inoperative, and second cancellation means operated to render said visual signal control means inoperative.

5. A control system as claimed in claim 2 wherein said alarm detection means include: inhibit means connected to said command means operated in response to said command means to condition said alarm signaling means; and verification means connected to said point check means operated in response to said point check means to further condition said alarm signaling means.

6. A control system as claimed in claim 1 wherein said alarm detection means further include: status registration means connected to said point indicating means, operated in response to said indicating means to register the status of said means.

7. A control system as claimed in claim 6 wherein said status registration means comprise: a first status register operated to indicate a first status of said point indicating means and a second status register operated to register a second status of said point indicating means.

8. A control system including a communication link, connected to said link at least one remote station including a plurality of controllable devices each operable in two or more modes, a master station including selection means comprising: point selection means operated to select one of said controllable devices, command means operated to select the mode of operation of said selected device, point check means operated to verify the mode of operation of said selected device, point indicating means associated with said devices operable to indicate each mode of operation of said devices, receiving means connected between said communication link and said point indicating means operated in response to signals received from said remote station over said link to operate said indicating means, and alarm means comprising: inhibit means connected to and operated in response to said command means; verification means connected to and operated in response to said point check means; first status registration means connected to said point indicating means operated to indicate a first mode of operation indicated by said indicating means; second status registration means connected to said point indicating means operated to indicate a second mode of operation indicated by said indicating means; at least first, second, third, and fourth status reporting means each connected to said receiving means, and each operated in response to different signals received by said receiving means from said remote station; alarm signaling means; and alarm detection means including circuit connections to said status reporting means, to said status registration means, to said inhibit means, to said verification means, and to said alarm signaling means, operated in response to said first status reporting means to operate said alarm signaling means.

9. A control system as claimed in claim 8 wherein said alarm detection means operate in response to said second status reporting means, to operate said alarm signaling means.

10. A control system as claimed in claim 8 wherein said alarm detection means are conditioned in response to said first status registering means, and operated in response to said conditioning and said third status reporting means, to operate said alarm signaling means.

11. A control system as claimed in claim 8 wherein said alarm detection means are conditioned in response to said second status registering means, and operated in response to said conditioning and said fourth status reporting means, to operate said signaling means.

12. A control system as claimed in claim 8 wherein said alarm detection means are initially conditioned in response to said inhibit means, are further conditioned in response to said first status registering means, and operated in response to said initial and further conditioning and operation of said second status reporting means, to operate said alarm signaling means.

13. A control system as claimed in claim 8 wherein said alarm detection means are initially conditioned in response to said inhibit means, further conditioned in response to said second registering means, and in response to said initial and further conditioning are operated in response to said first status reporting means, to operate said alarm signaling means.

14. A control system as claimed in claim 8 wherein said alarm detection means are initially conditioned in response to said inhibit means, further conditioned in response to said verification means; and finally conditioned in response to said first status registering means, and in response to said initial, further and final conditioning are operated in response to said first status reporting means, to operate said alarm signaling means.

15. A control system as claimed in claim 8 wherein said alarm detection means are initially conditioned in response to said inhibit means, further conditioned in response to said verification means, and finally conditioned in response to said second status registering means, and in response to said initial, further and final conditioning are operated in response to said second status reporting means, to operate said alarm signaling means.

References Cited

UNITED STATES PATENTS

| | | | |
|---|---|---|---|
| 2,944,247 | 7/1960 | Breese | 340—163 |
| 3,046,525 | 7/1962 | Deming et al. | 340—163 |
| 3,349,374 | 10/1967 | Gabrielson et al. | 340—163 |
| 3,350,687 | 10/1967 | Gabrielson et al. | 340—163 |

HAROLD I. PITTS, Primary Examiner

U.S. Cl. X.R.

340—147, 151, 167, 168

UNITED STATES PATENT OFFICE
CERTIFICATE OF CORRECTION

Patent No. 3,493,930                                    February 3, 1970

Robert E. Stoffels et al.

It is certified that error appears in the above identified patent and that said Letters Patent are hereby corrected as shown below:

Column 13, line 54, "martix" should read -- matrix --. Column 16, line 27, after "relay TM" insert -- will place ground on lead ECM relating to Fig. 12 --; line 35, "would" should read -- could --.

Signed and sealed this 17th day of November 1970.

(SEAL)
Attest:

Edward M. Fletcher, Jr.                                   WILLIAM E. SCHUYLER, JR.
Attesting Officer                                                Commissioner of Patents